US008307000B2

(12) United States Patent
Holcombe et al.

(10) Patent No.: US 8,307,000 B2
(45) Date of Patent: Nov. 6, 2012

(54) COMMON POINT AUTHORING SYSTEM FOR THE COMPLEX SHARING OF HIERARCHICALLY AUTHORED DATA OBJECTS IN A DISTRIBUTION CHAIN

(75) Inventors: Steven L. Holcombe, Stillwater, OK (US); Marvin L. Stone, Stillwater, OK (US)

(73) Assignee: Pardalis, Inc., Stillwater, OK (US)

( * ) Notice: Subject to any disclaimer, the term of this patent is extended or adjusted under 35 U.S.C. 154(b) by 0 days.

(21) Appl. No.: 13/086,997

(22) Filed: Apr. 14, 2011

(65) Prior Publication Data

US 2011/0191830 A1  Aug. 4, 2011

Related U.S. Application Data

(63) Continuation of application No. 11/595,569, filed on Nov. 10, 2006, now Pat. No. 7,949,668, which is a continuation-in-part of application No. 10/684,045, filed on Oct. 10, 2003, now Pat. No. 7,136,869, which is a continuation-in-part of application No. 09/934,951, filed on Aug. 20, 2001, now Pat. No. 6,671,696.

(51) Int. Cl.
G06F 7/00 (2006.01)

(52) U.S. Cl. ............ 707/781; 707/783; 707/821; 726/2; 726/4

(58) Field of Classification Search .................. 726/4, 2; 707/999.103, 781, 783, 821
See application file for complete search history.

(56) References Cited

U.S. PATENT DOCUMENTS

| | | |
|---|---|---|
| 5,220,657 A | 6/1993 | Bly et al. |
| 5,511,197 A | 4/1996 | Hill et al. |
| 5,664,112 A | 9/1997 | Sturgeon et al. |
| 5,724,588 A | 3/1998 | Hill et al. |
| 5,726,884 A | 3/1998 | Sturgeon et al. |
| 6,003,035 A | 12/1999 | Breame |
| 6,167,394 A | 12/2000 | Leung et al. |
| 6,341,287 B1 | 1/2002 | Sziklai et al. |
| 6,397,115 B1 | 5/2002 | Basden |
| 6,438,560 B1 | 8/2002 | Loen |
| 6,493,719 B1 | 12/2002 | Booth et al. |
| 7,069,234 B1 | 6/2006 | Cornelius et al. |
| 7,092,914 B1* | 8/2006 | Shear et al. ..................... 705/67 |
| 7,136,869 B2 | 11/2006 | Holcombe et al. |
| 2003/0037041 A1 | 2/2003 | Hertz |

FOREIGN PATENT DOCUMENTS

WO  WO-0062220 A1  10/2000

OTHER PUBLICATIONS

In the United States Patent and Trademark Office U.S. Appl. No. 11/595,569 Non-Final Office Action dated Sep. 3, 2010, 11 pages. In the United States Patent and Trademark Office U.S. Appl. No. 10/684,045 Non-Final Office Action dated Feb. 10, 2006, 6 pages.
European Patent Office Communication pursuant to Article 96(2) EPC, Apr. 28, 2006, 6 pages.
Peters et al.; "CrystalWeb—A distributed authoring environment for the World-Wide Web," *Computer Networks and ISDN Systems*, 1995; 27(6):861-870.
Zhang et al.; "DAPHNE—A tool for Distributed Web Authoring and Publishing," *ASIS (American Society for Information Science) 62nd Annual Meeting*, 1999; Washington, DC.

* cited by examiner

*Primary Examiner* — Shew-Fen Lin
*Assistant Examiner* — Jieying Tang
(74) *Attorney, Agent, or Firm* — Patton Boggs LLP

(57) ABSTRACT

The Common Point Authoring system functions to provide Livestock Informational Objects via the use of a centralized repository of uniquely identified, immutable Livestock Informational Objects. This system automates the authoring, maintenance, and distribution of the Livestock Informational Objects by using an Internet-based paradigm and a centralized repository of uniquely-identified, immutable Data Elements. The Common Point Authoring system provides a set of software modules that the manufacturers can use to author, maintain, and distribute Livestock Informational Objects and their customers, as Members of the system of Livestock Informational Objects, can use to retrieve, maintain, and distribute the Livestock Informational Objects. The system's interconnectivity allows for the use of an Internet-based paradigm for the purchase and sale among Members of the system of Livestock Informational Objects as commodities, and for reducing the burden costs among Members of compliance with government regulations.

14 Claims, 20 Drawing Sheets

LIVESTOCK PRODUCT DISTRIBUTION WITH
COMMON POINT AUTHORING SYSTEM

COMMON POINT AUTHORING SYSTEM FOR THE COMPLEX SHARING OF HIERARCHICALLY AUTHORED DATA OBJECTS IN A DISTRIBUTION CHAIN

CROSS-REFERENCE TO RELATED APPLICATIONS

This Application is a Continuation of U.S. patent application Ser. No. 11/595,569 filed on Nov. 10, 2006; which is a Continuation-in-part of U.S. patent application Ser. No. 10/684,045 filed on Oct. 10, 2003, now U.S. Pat. No. 7,136,869 issued Nov. 14, 2006; which is a Continuation-in-part of U.S. patent application Ser. No. 09/934,951 filed on Aug. 20, 2001, now U.S. Pat. No. 6,671,696 issued Dec. 30, 2003. All of the above-referenced applications are hereby incorporated by reference to the same extent as though fully contained herein.

FIELD OF THE INVENTION

This invention is an automated system known as the Common Point Authoring system that facilitates the immutable authoring, unique identification, authentication, tracking, ownership and control, advertising, sale and/or purchase of Informational Objects that are authored in and along an ownership segmented commercial supply, distribution, and consumption chain as part of a product creation, product manufacturing, product distribution, and/or product consumption process.

BACKGROUND OF THE INVENTION

Generally

It is a problem in the field of product creation, product distribution, and/or product consumption to immutably author, maintain, and distribute intangible Informational Objects that identify a particular physical product or processed product as it progresses through an ownership segmented commercial supply, distribution, and consumption chain. The problem is further exemplified by the need for each Owner who obtains possession of a physical product or processed product in the chain to author Informational Objects that can be used to identify, characterize, and authenticate the product. It is a further problem to authenticate Informational Objects containing immutable data, and to update the Informational Object to provide data regarding the history of the physical or processed product within the ownership segmented commercial supply, distribution, and consumption chain. It is a further problem to employ the Informational Objects for tracking a physical or processed product to which the Informational Object has reference both up and down an ownership segmented commercial supply, distribution, and consumption chain. It is a further problem for the Owner of a physical or processed product to be empowered with sufficient ownership, authority, and control over an authored Informational Object to enable the Informational Object to become its own distinct commodity separate and apart from the commodity of the physical or processed product to which the Informational Object has reference. It is a further problem to provide a globally accessible marketplace for commercial activity whereby the authored Informational Objects having reference to a physical or processed product may be advertised, offered, purchased, and sold between and among the Owners and Consumers of the physical or processed products.

An example of the need for Informational Objects is the ownership segmented commercial supply, distribution, and consumption chain of the beef livestock industry. Authenticated Informational Objects are needed in this industry to track animals and their products from genetic selection and birth to consumption for compliance with appropriate government regulations and/or for commercial reasons. In order to describe the present Common Point Authoring system, the beef livestock industry's commercial supply, distribution, and consumption chain, therefore, is used as a practical example that illustrates the capabilities and operation of the present Common Point Authoring system.

Beef Livestock Industry

Historically, the beef livestock industry has operated under an ownership segmented structure which is based on separate production and distribution sectors. While production segments may overlap within one business enterprise, beef livestock industry supply and distribution segments (Livestock Breeder, Livestock Producer, Livestock Processor, Distributor, Retailer) have traditionally been independent of one another, which is the result of specific, highly specialized production practices and economic competition.

The independence and segmented ownership of each segment has and does cause antagonisms within the beef livestock industry supply and distribution chain. Each independent segment tends only to do the minimal practices and management techniques necessary for that segment because it is oftentimes felt by the Owners within each segment that there is no economic benefit to do otherwise. In addition, information is rarely passed up or down the supply and distribution chain by an Owner within a segment to an Owner in another segment for fear of putting one Owner at an economically competitive disadvantage to another.

The result of the beef livestock industry's segmented and antagonistic supply and distribution chain is variable product quality that often fails to realize the primary goal of the beef livestock industry, which is to produce a quality product at a profit. As a result, the beef livestock industry's supply and distribution chain has traditionally produced and distributed beef as a generic product to Consumers devoid of information about the source of the product or the processes and means used for producing, processing, and distributing the product.

Changes in the beef livestock industry have focused attention on the goal of producing quality beef. However, the technology for dispelling the economic antagonisms among and between the disparate Owners and Consumers along the supply, distribution, and consumption chain has been unavailable. While Consumers have indicated that they want a safe, convenient, and consistent quality product, the ability of Consumers to get their message back to Livestock Breeders, Livestock Producers, Livestock Processors, Distributors, and Retailers is muted by the inefficiencies in information flow that continue within the beef livestock industry's supply, distribution, and consumption chain.

The effect of the inefficiencies in information flow among the segments of the beef industry's supply, distribution, and consumption chain has been noted by the United States Department of Agriculture, which has found that an epidemiologist doing a traceback search on diseased cattle today requires anywhere from two days to twelve weeks, and even then the chances of a successful traceback are far from certain. While animal identification and tracking does not insure an animal's health or prevent introduction of animal diseases, the ability to quickly track animals can mitigate the effects of virulent diseases by accelerating the response time. The National Institute for Animal Agriculture (NIAA) organized the National Food Animal Identification Task force in April 2002 to develop a national plan covering animals from birth to harvest. According to this task force, maintaining the health of the United States herd is the most urgent issue and, therefore, is the most significant focus of the National Identification Work Plan. The long-term objective is to establish an animal identification and information system that has the capability to identify all premises that had direct contact with a foreign animal disease within 48 hours after discovery. The key elements include a uniform premises identification system and a uniform, nationally recognizable, numbering system for individual animals. These objectives have been continued in the successor United States Animal Identification Plan issued in September 2003. A challenge to the success of the plan is the broad distribution of a national livestock identification system to, and usage by, a critical mass of Livestock Breeders, Livestock Producers, and Livestock Processors.

Although there are a number of vertically coordinated or vertically integrated systems in existence for identification, data management, and traceability, it is a problem in the beef livestock industry's supply, distribution, and consumption chain that there is no globally accessible "umbrella" system available to any Owner of an animal or its distributed products, or any Consumer of a distributed product, that uniquely identifies and authenticates data objects, having reference to uniquely identified animals and their products, in the hands of such Owners or Consumers. It is a further problem that no umbrella systems exist to provide efficient interconnectivity among such Owners and Consumers as the animals are transferred from Owner to Owner, from birth to harvest, and then distributed to the Consumer.

It is a problem within the beef industry's supply, distribution, and consumption chain that there is no globally accessible system for providing standards of compatibility and information flow between existing systems and a means for reliably capturing the identity and history of movement of animals. Furthermore, the lack of information flow is not solvable without technologically addressing the issue of data ownership and control over Informational Objects. Ownership and control over Informational Objects is crucial within the beef livestock industry's supply, distribution, and consumption chain. For example, even with a focus within the United States Animal Identification Plan described above, upon the best available means for standardizing source information and centralizing its collection, without solving the issue of ownership and control of data as an incentive against low or absent effort, the result of the United States Animal Identification Plan may yet be distorted, missing, or unusable data.

Presently, there is no globally accessible, centralized system in which Owners of animals or animal products, or Consumers of animal products, may uniquely identify and authenticate, track, own and control, advertise, sell, and/or purchase Informational Objects having reference to animals and their products within the beef livestock industry's supply, distribution, and consumption chain. Thus, there is a need to provide a globally accessible system to the Owners and Consumers found within the beef livestock industry's supply, distribution, and consumption chain as a marketplace in which uniquely-identified, immutable data about animals and their animal products may be authored as an Informational Object, and such objects may be advertised, sold, purchased, and exchanged as a new, distinct commodity separate and apart from the physical commodity to which it has unique reference. The beef livestock industry is illustrative of the nature of this problem and is used as an example for the purpose of illustrating the operation of the present Common Point Authoring system but is not intended to limit the scope of the described system. The Common Point Authoring system may have application to any industry where information having reference to a physical or processed product has need to be authored, uniquely identified, authenticated, tracked, Owner controlled, advertised, sold, and/or purchased for compliance with governmental regulations and/or for commercial reasons.

BRIEF SUMMARY OF THE INVENTION

The above-described problems are solved and a technical advance achieved by the present Common Point Authoring system for the beef livestock supply, distribution, and consumption chain. The Common Point Authoring system provides functions for immutably authoring, maintaining, and distributing intangible Livestock Informational Objects throughout the ownership segmented chain for an animal and its distributed products, whereby the Livestock Informational Objects authored by each Owner of the animal or distributed animal product, or each Consumer of the distributed animal products, can be used to uniquely identify and authenticate an animal or uniquely identified animal product to which the Informational Object has reference. The Common Point Authoring system further provides functions for authenticating Livestock Informational Objects containing immutable data, and functions for updating the Informational Object to provide data regarding the history of the animal or animal product within the ownership segmented commercial supply, distribution, and consumption chain. The Common Point Authoring system further provides functions for employing the Livestock Informational Objects for tracking a uniquely identified animal or distributed animal product to which the Livestock Informational Object has reference both up and down the ownership segmented beef livestock supply, distribution, and consumption chain. The Common Point Authoring system further provides functions for the Owner of an animal to be empowered with sufficient ownership, authority, and control over an authored Livestock Informational Object so as to enable the Informational Object to become its own distinct commodity separate and apart from the commodity of the animal or animal product to which the Livestock Informational Object has reference. The Common Point Authoring system further provides a globally accessible marketplace for commercial activity whereby the authored Livestock Informational Objects having reference to an animal or animal product may be advertised, offered, bought and sold by, between, and among the Owners and Consumers of the animal or animal product.

Furthermore, the above-described problems are solved and a technical advance achieved by the present Common Point Authoring system which functions to provide Livestock Informational Objects via the use of a centralized repository of uniquely identified, immutable Livestock Informational Objects which include data relating to animal identification, premises identification, and a history of movement of the animals within this chain of commerce. This system automates the authoring, maintenance, and distribution of the Livestock Informational Objects by using an Internet-based paradigm and a centralized repository of uniquely-identified, immutable Data Elements. The Common Point Authoring system provides a set of software subsystems that the animal breeders, producers, harvesters, processor, distributors, and retailers can use to author, maintain, and distribute Livestock Informational Objects which their customers, as Subscribers to the Common Point Authoring system, can use to retrieve, maintain, and distribute the Livestock Informational Objects.

The system's interconnectivity allows for the use of an Internet-based paradigm for the purchase and sale of the data as commodities. The interconnectivity also allows the data that is gathered, in the form of Livestock Informational Objects, among Subscribers of the Common Point Authoring system, reduction of the burden costs among Subscribers for compliance with government regulations. In addition, the Common Point Authoring system can provide ancillary services by providing advertising of services and products thereby to facilitate the interconnection between Subscribers such as Livestock Breeders, Livestock Producers, Livestock Processors, Distributors, Retailers, and Consumers. Further, the Common Point Authoring system can allow third-party vendors who provide services and products related to the information and instructions contained in Livestock Informational Objects to advertise to potential customers.

The Common Point Authoring system uses an object-oriented framework for communication of the Livestock Informational Objects and other Informational Objects among the livestock producers, livestock producer's customers, the ultimate Consumers of the animal products, and third-party vendors. The Livestock Informational Objects are not document files or database files, but instead are objects that contain sequences of instructions and information on which the instructions operate. A particular Livestock Informational Object contains pointers that identify a plurality of immutable "building blocks" of information that, when collected, comprise the Livestock Informational Object. Each building block is comprised of a Data Element and a unique identifier that exclusively identifies that Data Element.

Since the Data Elements are fixed, they do not require updating, and a new version of a Livestock Informational Object for a particular animal simply includes a unique identifier that points to a replacement Data Element, while the original Data Element is maintained in the central database. Thus, for each venue, the contents of the Livestock Informational Object remain immutable, even though the format can vary. In addition, the creation of a new Livestock Informational Object can utilize existing Data Elements from the central database if the content of the associated portion of the Livestock Informational Object is identical to this Data Element. Thus, authoring new Livestock Informational Objects can benefit from a repository of standardized Data Elements, with only the unique segments of the new Livestock Informational Object requiring the creation of a new Data Element. Translations of the Data Elements into other languages are also simplified since the Common Point Authoring system mandates the use of standardized phrases and other associated data in the creation of the various Data Elements. In addition, the Data Elements can be exported to another database system.

The Common Point Authoring system is also an integrated identification system that, through established standards and defined Data Elements, allows for the compatibility of systems while providing the efficient availability of information across each segment of the animal agriculture industry. The source and identification components, including the animal and premises identification envisioned by the United States Animal Identification Plan described above, can be used to support animal disease tracking and management as well as provide production management information within the production management environment. While the basic animal health component appears to be distinct from the production and marketing component, the exchange of data between these two components provides a synergy that benefits both segments in terms of cost reduction and enhanced quality of the resultant products.

The Common Point Authoring system can support various granularities in the level of object identification. The granularity of the identification required can be a function of the product and the management of its movement through the chain of commerce. Thus, in some cases, each individual animal must be tracked and, in other cases where a collection of animals born on the same premises move through the production chain to harvest as one group, a group identification can be used to identify all of the animals in the unbroken collection.

In addition to the tracking of animals from birth to harvest, an extension of this process is to track the products that are created as a result of the harvest. This reflects the need to provide food safety for the Consumers and requires that the animal tracking paradigm be extended also to be applicable to fabricated components of the animal as they are individually processed into different end products and distributed to Consumers, frequently in different chains of commerce. The Common Point Authoring system anticipates cost effective, efficient, and comprehensive product identification systems, for example DNA or genetic identification, and tracking of the fabricated components or products of the animal from harvest of the animal and creation of those products to their consumption.

As Livestock Informational Objects are authored, maintained, and distributed, the relevant data regarding these processes and the entities participating in these processes may be used to trigger advertising to the participants. The capacity exists with the Common Point Authoring system for a Subscriber to permit or not permit advertisers to use or access information within Livestock Informational Objects owned or controlled by such a Subscriber. When permitted by a Subscriber within the Member ID Informational Object, the authoring, maintenance, or distribution of a Livestock Informational Object may be used as an opportunity for permitted advertisers to identify products and services that are pertinent to the animal identified in the Livestock Informational Object in terms of context sensitive, real-time advertising access to Subscribers who access the Livestock Informational Objects.

DETAILED DESCRIPTION OF THE INVENTION

Figure 1A:
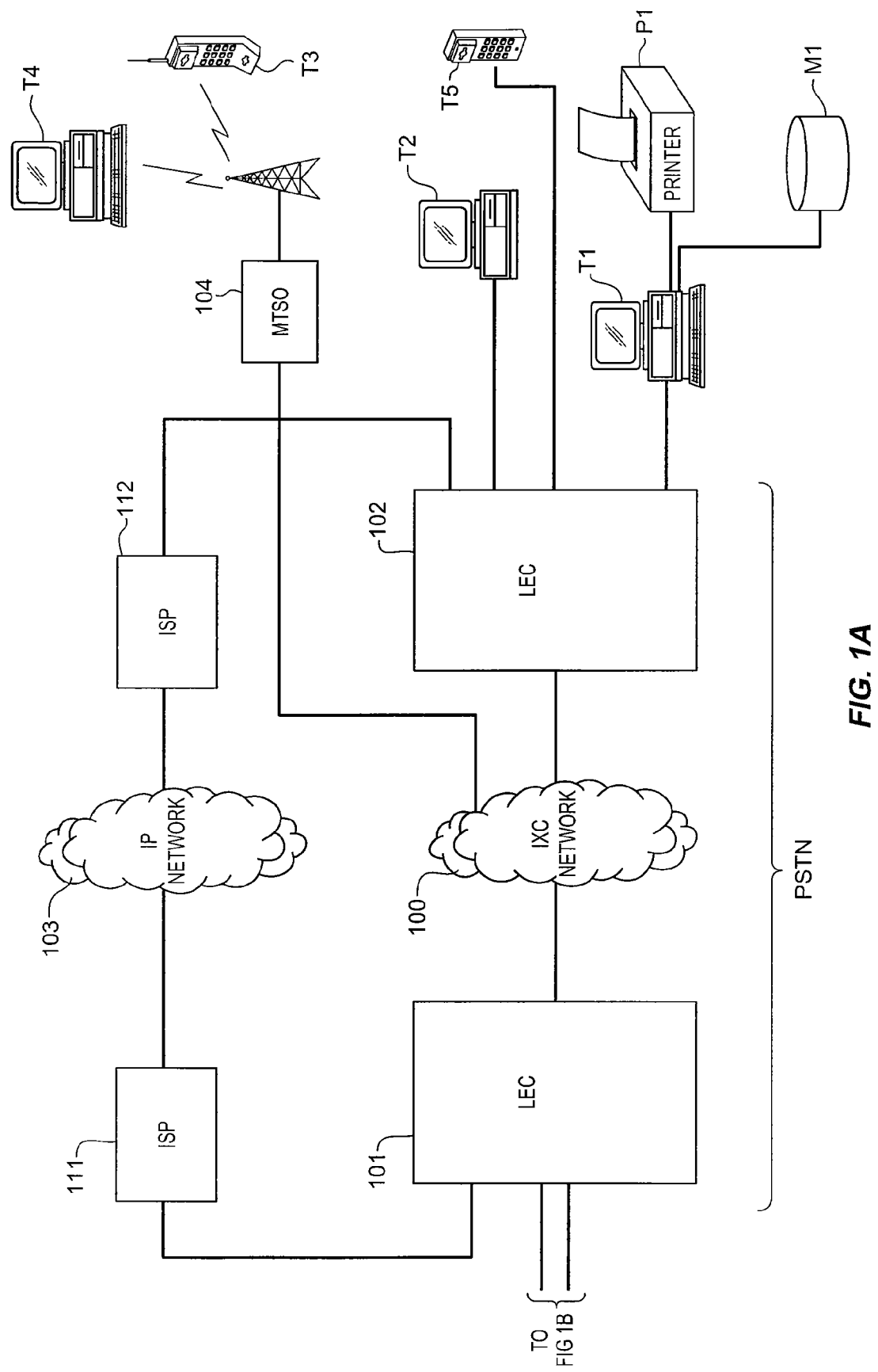
FIGS. 1A and 1B illustrate, in block diagram form, the overall architecture of the present Common Point Authoring system and an environment in which it is operational.

The present Common Point Authoring system 10 functions to enable Subscribers to immutably author, uniquely identify, authenticate, track, own and control, advertise, sell, and/or purchase Informational Objects describing an animal or its products within the beef livestock supply, distribution, and consumption chain. To accomplish the authentication task, the Informational Object must contain immutable data, yet the Informational Object must also be capable of being updated with data regarding the history of movement of the animal or its products within the livestock beef industry supply, distribution, and consumption chain 19.

There are many examples of products and associated manufacturing and/or production processes to which this system is applicable. In order to illustrate the concepts of the present Common Point Authoring system, the supply chain that is comprised of the livestock industry and food distribution network is used as an example. In the beef livestock supply, distribution, and consumption chain environment, the Common Point Authoring system functions to provide Livestock Informational Objects via the use of a centralized repository of uniquely identified, immutable Livestock Informational Objects. This system automates the authoring, maintenance, and distribution of the Livestock Informational Objects by using a network-based paradigm and a centralized repository of uniquely-identified, immutable Data Elements. The Common Point Authoring system can be provided with a set of software components or subsystems that the livestock producer and processor can use to author, maintain, and distribute Livestock Informational Objects which their customers, as Subscribers to the Common Point Authoring system, can use to retrieve, maintain, and distribute the Livestock Informational Objects. The system's interconnectivity allows for the use of an Internet-based paradigm for the advertising, purchase, and sale of the Livestock Informational Objects among Subscribers of the Common Point Authoring system as commodities separate and distinct from the animals or animal products to which they are referenced, and for reducing the burden of costs among Subscribers in compliance with government regulations. In addition, the Common Point Authoring system can provide ancillary services by providing advertising of services and products facilitating the interconnection of the producers and producer's customers with other Subscribers to the Common Point Authoring system who are vendors, and who provide services and products related to the information and instructions contained in Livestock Informational Objects.

Definitions

For the purpose of this description, the following terms are defined:

Subscriber comprises an entity, either a business or an individual, who is authorized to access and utilize the capabilities of the present Common Point Authoring system. A Subscriber may be a Livestock Breeder, Livestock Producer, Livestock Processor, Distributor, Retailer, Consumer, or any entity that owns or consumes an animal or its products within the livestock beef industry supply, distribution, and consumption chain. A Subscriber may also be a third party vendor who advertises to provide services and products related to the information and instructions contained in Livestock Informational Objects.

Member is synonymous with Subscriber.

Livestock Breeder comprises an entity, either a business or an individual, who typically provides genetic materials or breeds animals and manages them through the birthing process.

Livestock Producer comprises an entity, either a business or an individual, who typically raises, feeds, and warehouses animals, such as a stocker operator, importer, or feedlot operator.

Livestock Processor comprises an entity, either a business or an individual, such as a packer, who typically harvests the fabricated products of an animal, or a pharmaceutical company, rendering operator, or pet food companies, who typically process the fabricated products of an animal.

Distributor comprises an entity, either a business or an individual, who typically distributes animal products, or processed animal products, to Retailers at wholesale prices.

Retailer comprises an entity, either a business or an individual, who typically sells animal products, or processed animal products, to Consumers at retail prices.

Consumer comprises an entity, either a business or an individual, who typically purchases an animal product, or processed animal product, from a Retailer.

Terminal Device comprises a personal computer, hand held computing device, cellular communication device, wireless computer device, or other data interface device. Typically, the terminal device used is a full function communication device of the type that includes: cellular telephones, personal digital assistants, personal computers, and the like, or some other specialized communication device.

A Data Element is the smallest unit of data in the Common Point Authoring system. A Data Element may be any information and/or any instructions. A Data Element is immutable and uniquely identified if registered for use with the Common Point Authoring system.

A Data Element Set is comprised of two or more Data Elements. A Data Element Set is immutable and uniquely identified if registered for use with the Common Point Authoring system. A registered Data Element Set may be composed of one or more unregistered Data Element(s), one or more registered Data Element(s), or a mix of both registered and unregistered Data Element(s).

An Informational Object is comprised of one or more Data Elements, Data Element Sets, or Informational Objects, or any combination thereof. An Informational Object is immutable and uniquely identified if registered for use with the Common Point Authoring system. An Informational Object is the largest group of data in the Common Point Authoring system and may be industry specific.

A Registered Informational Object may be composed of one or more Registered Informational Objects, unregistered Informational Objects, unregistered Data Elements, unregistered Data Element Sets, registered Data Elements, registered Data Element Sets, or any combination thereof.

Permissions are attributes associated with either Data Elements or Informational Objects that control access by Members. Permissions may have either a positive or a negative effect. Permissions may be (1) exclusive or non-exclusive, (2) conditional or permanent, and/or (3) limited or unrestricted, or any combination thereof. Following registration of an Informational Object, a Member having permission to access an object may grant, cancel, or modify Permissions for the Informational Object or a Data Element if the action taken does not exceed the authority of the Member and does not violate the grant of a prior Permission.

Figure 19:
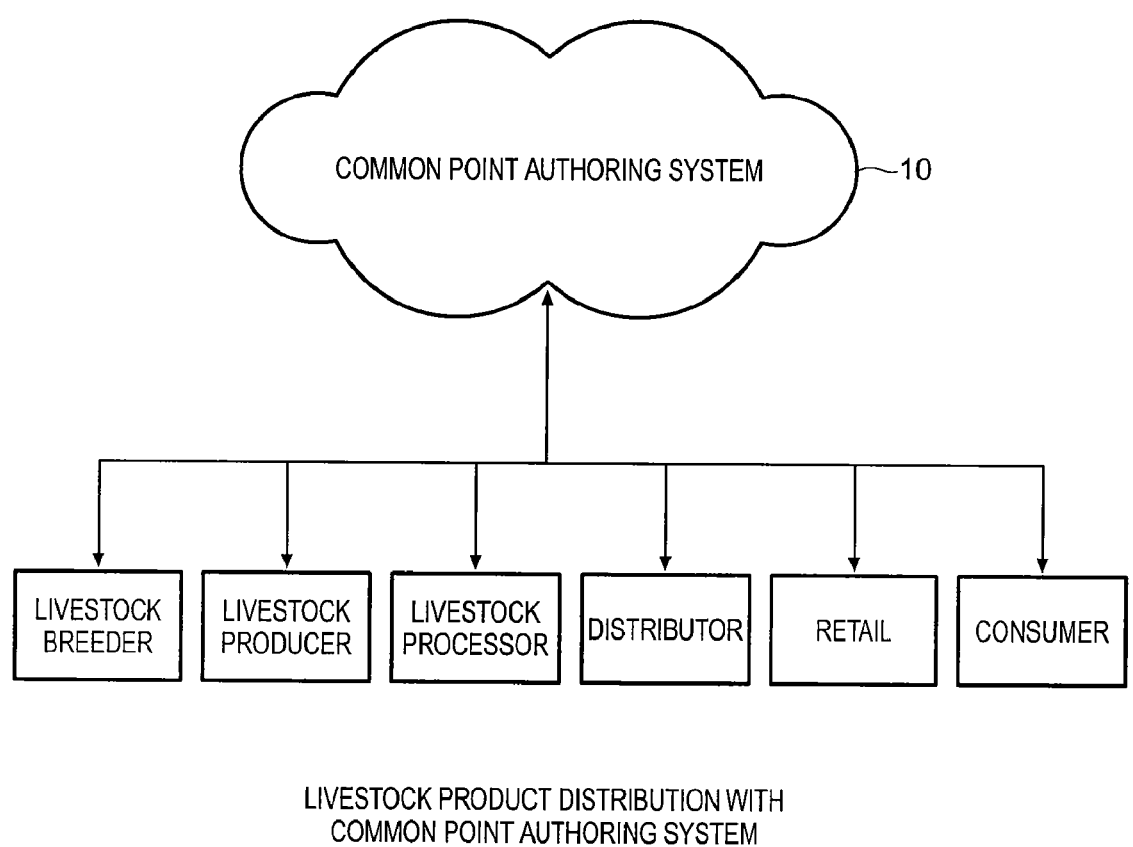
FIG. 19 illustrates, in block diagram form, the typical segments of the livestock beef industry's product creation, supply, distribution, and consumption chain and the flow of Livestock Informational Objects in relation to these typical segments and the Common Point Authoring system.

Owner in the context of the beef livestock industry's supply, distribution, and consumption chain of FIG. 19 means a Livestock Breeder, Livestock Producer, Livestock Processor, Distributor, Retailer, and/or a Consumer who typically owns or possesses genetic matter applied to the conception of animals, or typically owns or possesses conceived animals, animal products, or processed animal products.

Owner in the context of a Registered Informational Object means a Subscriber who sets the Permissions for an Informational Object or Data Element. The Permissions set for an Informational Object and/or Data Element must have an Owner and/or one or more other Members who cumulatively control all possible Permissions that may be respectively granted, cancelled, or modified for the respective Informational Object or Data Element.

Livestock Informational Object is an Informational Object that may contain information and/or instructions relevant to the pre-conception genetic information of one or more animals, to the history of such one or more animals, to the history of their animal products, and/or to the history of the consumption of their animal products.

Concerns Addressed

The larger concerns addressed within the beef livestock industry's supply, distribution, and consumption chain by the Common Point Authoring system are complex but interrelated. The concerns addressed are: food safety, animal identification, veterinary health, information flow, and beef quality. The solution is the deployment of the Common Point Authoring system as a globally accessible information technology system in which data ownership is technologically vested in the Owners or Consumers of the livestock or their products.

Veterinary Health & Animal Identification

The introduction of foreign animals into a herd or the incursion of a disease into a closed herd requires rapid detection and response to prevent widespread contamination of the resident population. The random sampling of animals to determine the presence or absence of a disease is a costly process and fraught with errors. The ability to gather accurate real time data would enable the processing of the bio-statistics to arrive at scientifically based conclusions from which herd management decisions may be made. The ability to quickly detect and track foreign or emerging diseases across international boundaries would enable producers to protect against the spread of the disease and lessen the negative economic impacts on the production and marketing of the animals.

In order to have an effective system, each animal must be uniquely identified, their present location identified, and, preferably, their history of movement within the production process tracked. The ability to identify all premises that had contact with an infected animal and the other co-resident animals at the time of contact is required for timely traceback of animals. The identification of all contacts and the monitoring of sub-groups within the population that have been in contact with an infected animal are critical factors in the ability to detect the presence of a disease and control its spread. This requires the recordation of the movement of individual animals or units of animals in a central database or linked seamlessly to enable access on a virtual database basis. In order to accomplish this, a standard method of identifying animals and premises must be established and implemented by the producers throughout the production, harvesting, and product creation process. The United States Animal Identification Plan addresses the standardization of such source information.

The location issue includes the ability to record an animal's origin and movement to other locations for the entirety of its life. This includes coordination of location data on a temporal basis to determine the contacts a specific animal had with other animals at each premises, including other production units, transportation facilities, markets, exhibitions, and public sales. Each site is unique if it is geographically and/or epidemiologically distinct from other sites. Each site will also be traced to an authorized user who operates the facility located at the site.

Food Safety & Animal Identification

The location at which an animal is harvested must be recorded and the distribution of all harvested products tracked. Thus, the above-noted unique animal identification expands into a one-to-many paradigm where the uniquely identified animal is fabricated into a plurality of uniquely identified products, each traceable back to the uniquely identified animal and their history. Likewise, the identification of the plurality of uniquely identified products facilitates the traceback from a processed mixture of fabricated products from many different animals to a single uniquely identified animal.

The above-noted process extends into the food production process, where animals are processed and the resultant animal products distributed. The ability to track animals and other agricultural commodities from birth to fabricated product would protect the Consumer against impure, unsafe, and fraudulently labeled food.

Information Flow and Beef Quality

As noted above, source information, upon which the standardization efforts of the United States Animal Identification Plan are focused, and the larger universe of process information for animal products, insures animal traceability and can add value to animal products through product differentiation relating to source, health, genetics, and other distinguishing characteristics of the animals and their animal products.

The livestock identification software systems that are presently available provide for the inventorying of identification information that is difficult and expensive to pass up and down the commercial chain because of the Owner segmented nature of the beef livestock industry. Common examples of this fragmentation are the incompatibility of software products and the upfront costs of available software systems. The result is that the choices that a Consumer makes in purchasing an animal's product, and the reasons for those choices, cannot be communicated up the supply, distribution, and consumption chain to the Livestock Breeder, Livestock Producer, and Livestock Processor. Without this information, the Livestock Breeder, Livestock Producer, and Livestock Processor cannot adjust their management processes to provide a higher quality product. Likewise, the Livestock Breeder, Livestock Producer, and Livestock Processor are unable to pass along the information that does exist about their animals to the Consumer because there is no efficient means for doing so. The beef livestock industry as a whole cannot improve its product because it cannot efficiently move information up and down the supply, distribution, and consumption chain 19.

Centralization & Data Ownership

The need for increasing information flow between the segments of the industry and improving beef quality in the beef livestock industry is unmet because of the absence of a globally accessible "umbrella" information technology system that facilitates immutable authoring, unique identification, authentication, tracking, ownership and control, advertising, sale, and/or purchase of Informational Objects that are authored in and along the livestock beef industry supply, distribution, and consumption chain 19.

The technological vesting of data ownership in the Owners of livestock by an umbrella information technology system is absolutely essential to meeting the industry's needs because only the promise of data ownership control can attract critical mass usage to and of a globally accessible system. Only through the introduction of a globally accessible umbrella system, and the introduction of a Livestock Informational Object as a new profit center for livestock Owners, can the issues of food safety, animal identification, veterinary health, information flow, and beef quality be practically addressed.

Product Flow

FIG. 19 illustrates, in block diagram form, a typical production environment and product flow within that environment in relation to the present Common Point Authoring system. In this environment, the Common Point Authoring system 10 tracks each animal in a chain of production from genesis to harvest and can also be used to track the harvested products through delivery to the Consumer. FIG. 19 is only illustrative of one representation of this chain of supply, distribution, and consumption. For example, FIG. 19 could be re-configured into a plurality of the following segments for the purposes of data collection and aggregation:

Pre-conception genetic products associated with animal breeding,

Sources and locations of animals from birth to harvest,

Processes associated with growth of animals from birth to harvest,

Harvested animal products,

Processing of animal products,

Distribution and delivery of animal products to Consumers, and

Consumption by Consumers of animal products and opinions related thereto.

At each stage, there are a number of Data Elements that can be collected, and these can be mandatory Data Elements or discretionary Data Elements, all relating to the animal and to the purposes for which the data is to be used in the Common Point Authoring system 10. Since animals and animal products are affected by the passage of time, the data collection process is temporally based with the movement of the animal or animal products being tracked over time through each location.

The operation of the Common Point Authoring system 10, therefore, is hierarchical in nature, with each change in ownership and/or location of the animal requiring an update of the data stored in the Common Point Authoring system 10. As a practical matter to simplify the implementation of the Common Point Authoring system 10, the identification of animals may require the attachment of a device to the animal that is humanly readable and/or electronically readable, such as by radio frequency technology.

Terminal Equipment and Communications Environment

Figure 1B:
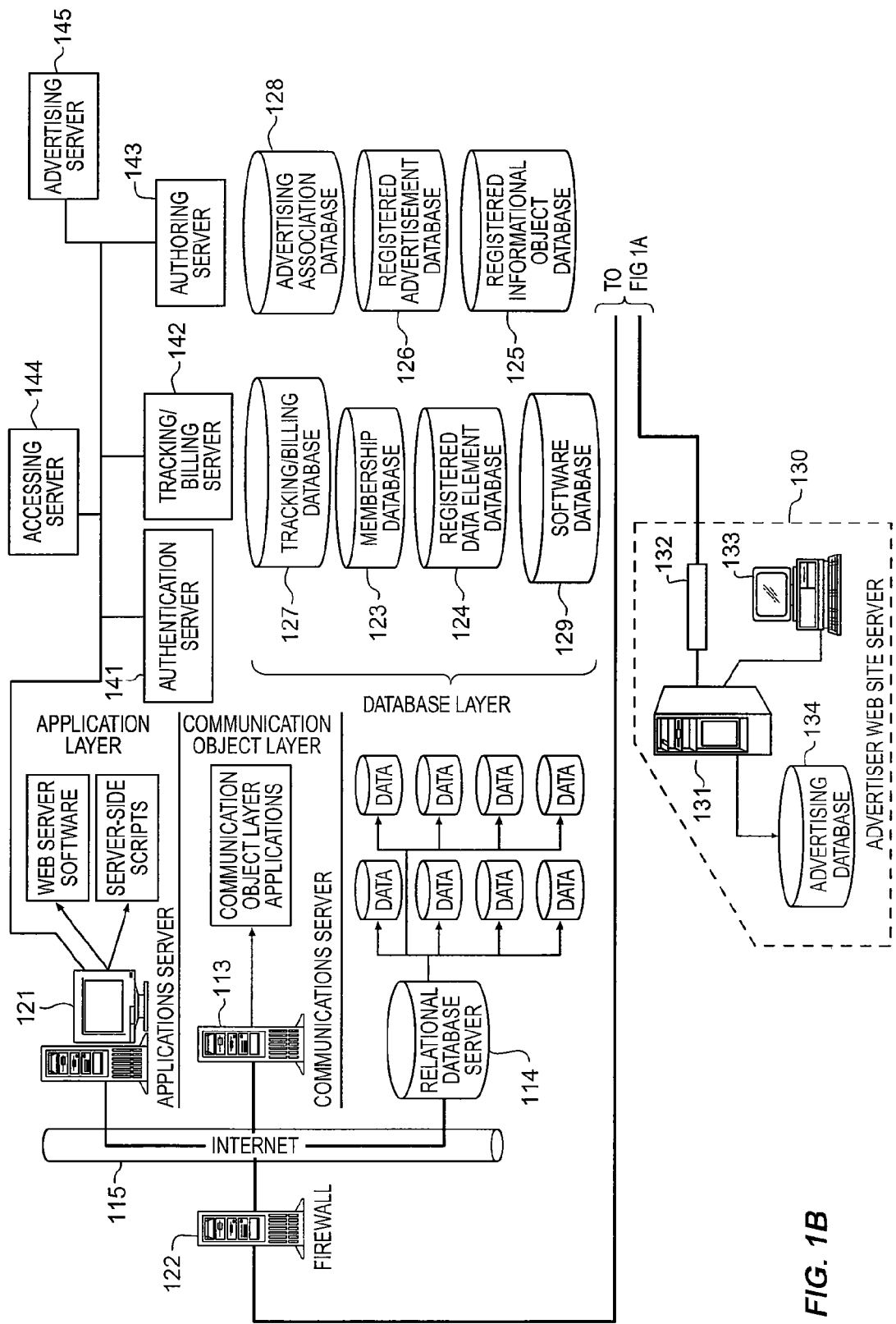

FIGS. 1A and 1B illustrate, in block diagram form, the overall architecture of the Common Point Authoring system 10 and a typical environment in which it is operational. The Subscribers are typically equipped with one or more of a personal computer T1, T2, hand held computing device or other device T5, cellular communication device T3, wireless computer device T4, or other data interface device, collectively termed "terminal equipment" herein. The data communication connection between the Subscriber's terminal equipment T1 and the present Common Point Authoring system 10 can be via the Internet 103, using the well-known personal computer modem and Internet browser technology available at the Subscriber's terminal equipment T1. The Subscriber's terminal equipment generally is served by the Public Switched Telephone Network (PSTN) which consists of a plurality of Local Exchange Systems 101, 102 interconnected via an Inter-Exchange Carrier Network 100. The physical connection that supports this data communication connection is typically effected from Subscriber's terminal equipment T1 through the Local Exchange System 102 of the Public Switched Telephone Network (PSTN) via a data communication medium (such as the Internet), termed IP Network 103 herein, to an Internet Service Provider 112 which is also connected thereto. The Internet 103 is also connected to a Local Exchange System 101 via Internet Service Provider 111 that serves the firewall 122 of the Common Point Authoring system 10. Alternatively, the Subscriber's terminal equipment, in the case of cellular communication device T3 or wireless computer device T4, is connected via the Mobile Telecommunications Switching Office (MTSO) 104 to the Public Switched Telephone Network (PSTN).

The Common Point Authoring system 10 is connected to at least one data communication medium 103 (such as the Internet) thereby to enable Subscribers to obtain data communication connections with the Common Point Authoring system 10, as described in more detail below. The typical architecture of the Common Point Authoring system 10 includes a firewall 122 which serves to protect the system from unauthorized access, as is well known in the art. An intranet 115 serves to connect the firewall 122 to the other system elements, such as the communications server 113 which implements the communications object layer of the Common Point Authoring system 10 by executing the communications object layer applications. These applications manage the communications with the Subscribers who access the Common Point Authoring system 10. In addition, the intranet 115 is connected to the Applications Server 121, which executes the Web server software to provide the Subscriber interface for use to access the data that is stored in the Common Point Authoring system 10. In addition, the Applications Server 121 executes the server side scripts that are part of the application layer to manage the Subscriber access. The relational database server 114 is also connected to the intranet 115 and interfaces the plurality of data storage elements of the database layer on which the data is stored. The nature of the stored data is described below. This architecture serves to distribute the functionality among a plurality of servers, but it is anticipated that alternative system architecture implementations are equally applicable to the concepts taught herein.

The Common Point Authoring system 10 includes a plurality of databases, as described below. These databases include, but are not limited to: Member database 123, registered Data Element database 124, registered Informational Object database 125, registered advertisement database 126, tracking/billing database 127, advertising association database 128, and software database 129. The databases noted herein are delimited by function for the purpose of simplifying the description of the Common Point Authoring system 10, but these databases can be implemented in a single physical database or a lesser or greater number of databases than is shown herein. Such selections are simply a matter of engineering choice and do not relate to the concepts disclosed herein. Similarly, an applications server 121 is illustrated herein, executing a plurality of software modules: authentication server 141, tracking/billing server 142, authoring server 143, Member accessing server 144, and advertising server 145; but multiple servers can be used to perform this task. Thus, the Common Point Authoring system 10 disclosed herein represents one of many possible implementations to provide the described functionality to the designated recipients.

In addition, other computer systems, such as Advertiser WEB Site Server 130, can be served by the Common Point Authoring system 10. The advertiser WEB site server system typically comprises a firewall gateway 132, a server 131, terminal device(s) 133, and a mass storage device represented here as an advertising database 134. Such a system can be used to create advertisement materials for use in conjunction with the Common Point Authoring system 10 and to be provided to Subscribers who are linked to the advertiser WEB site system by the operation of the Common Point Authoring system 10 as described below.

The resources illustrated herein are selected for the purpose of illustrating the concept of the Common Point Authoring system 10 and are not intended to limit the applicability of this concept to other network implementations or system configurations.

Physical System Model

The Common Point Authoring system software is an automated document authoring and distribution system that allows Subscribers to securely author, maintain, and distribute their own data for profit or to reduce the burden of costs for compliance with government regulations. The system may be used as a centralized repository with an Internet-based authoring and delivery mechanism so that participation only requires an internet connection and a web browser. The Common Point Authoring system's interconnectivity with other systems allows for the purchase and sale of Subscriber owned data as commodities and for reducing the burden of costs for compliance with government regulations.

Informational Object and Data Elements

Figure 2:
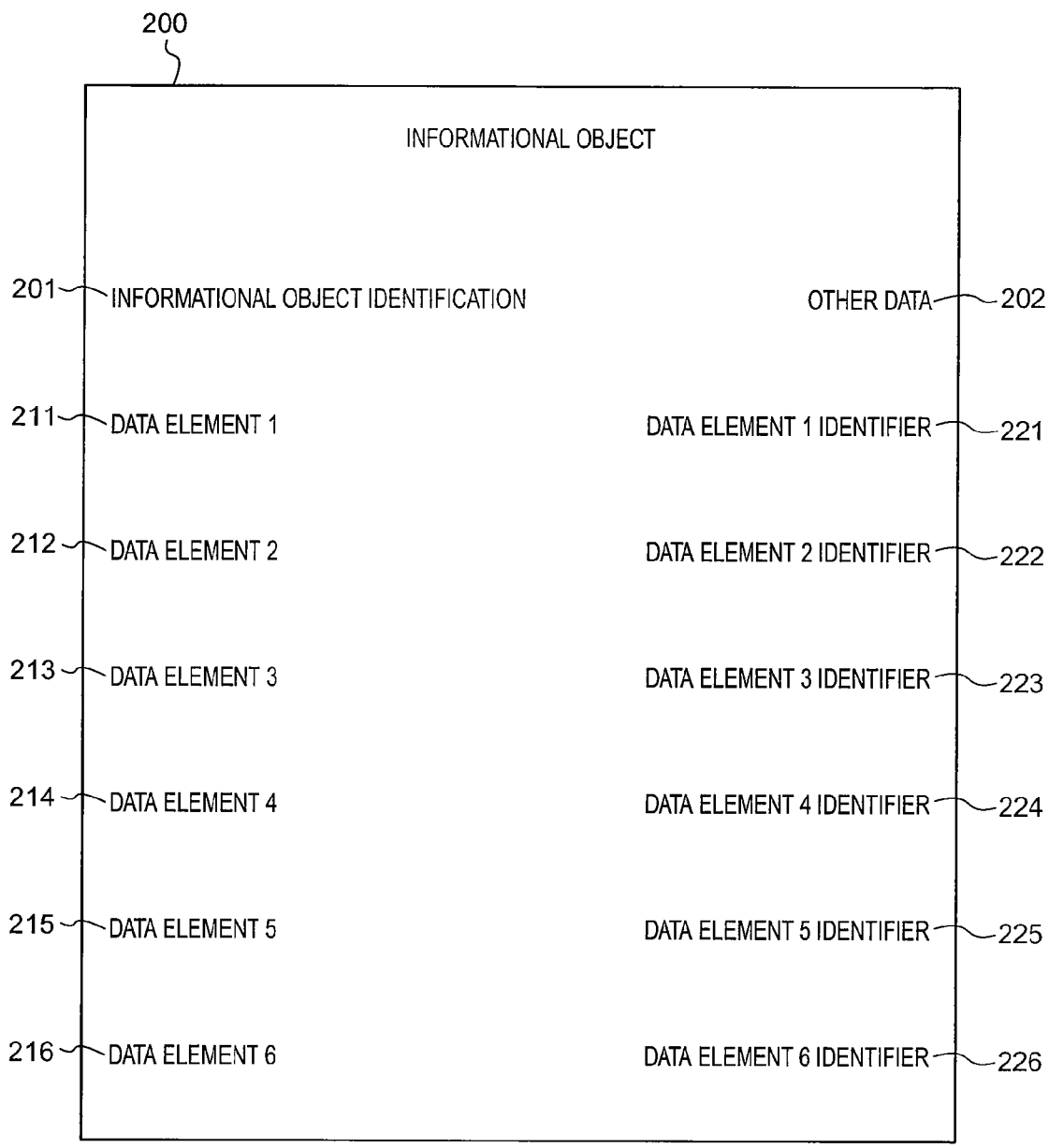
FIG. 2 illustrates a typical Informational Object and its contents that can be authored, distributed, and maintained by the present Common Point Authoring system.

FIG. 2 illustrates a typical Informational Object and its contents that can be authored, distributed, and maintained by the present Common Point Authoring system. In particular, the Informational Object 200 comprises a unique identifier 201 that designates the Informational Object 200, as well as a plurality of Data Elements 211-216, each of which itself is identified by a corresponding unique identifier 221-226. The Informational Object 200 can also contain other data 202, such as formatting data, Permissions data, unregistered Data Elements, registered data objects, unregistered data objects, registered data sets, and unregistered data sets. The Data Elements 211-216 that are associated with a particular Informational Object 200 typically are stored in a separate file system from the Informational Object 200, and are linked via the use of pointers, which comprise the Data Element unique identifiers 221-226.

Operation of the Common Point Authoring System

FIGS. 3 through 19 illustrate, in flow diagram form, the operation of the present Common Point Authoring system 10. The architecture of the Common Point Authoring system 10 described herein represents a typical implementation of the Common Point Authoring system 10 and its operating environment and is not intended to limit the scope of the underlying concept as defined in the enclosed claims.

Subscriber Enrollment Process

Figure 3:
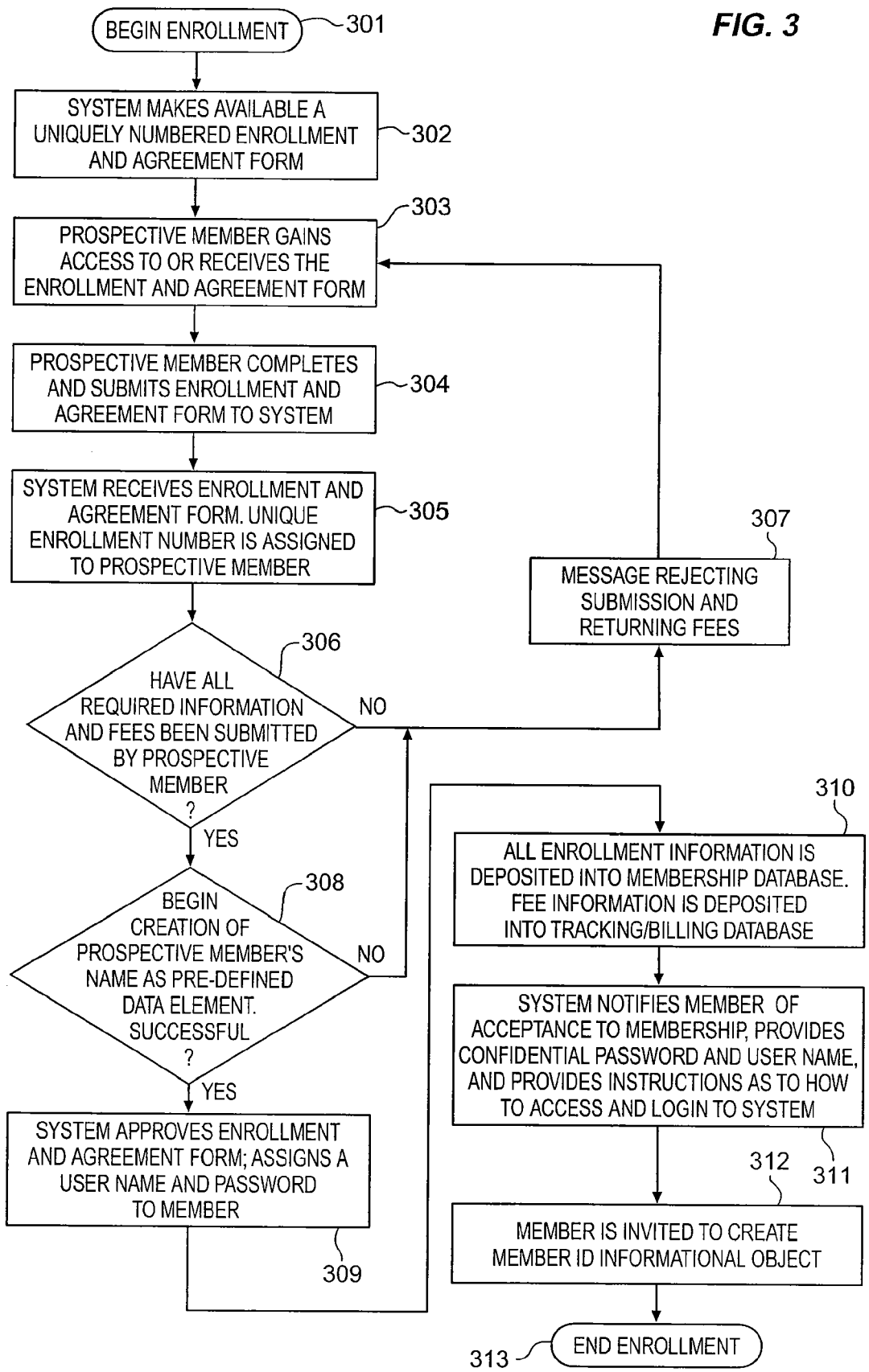
FIG. 3 illustrates, in flow diagram form, the operation of the Subscriber enrollment process of the present Common Point Authoring system.

FIG. 3 illustrates, in flow diagram form, the operation of the Subscriber enrollment process of the present Common Point Authoring system 10. The enrollment process is available to any Livestock Breeder, Livestock Producer, Livestock Processor, Distributor, Retailer, Consumer, or third-party vendor who advertises to provide services and products related to the information and/or instructions contained in Livestock Informational Objects.

At step 301, the prospective Subscriber, located at terminal device T1, initiates the enrollment process by activating their terminal device T1 to establish a communication connection to the Common Point Authoring system 10. Once connected thereto as described above, the Common Point Authoring system 10 generates a uniquely numbered enrollment and agreement form (not shown) at step 302 and transmits this form at step 303 to the prospective Subscriber at terminal device T1 via the communication connection thereby to enable the prospective Subscriber to become a Subscriber to the services provided by the Common Point Authoring system 10. The use of the uniquely numbered enrollment and agreement form enables the Common Point Authoring system 10 to present specific terms and conditions of subscription to the prospective Subscriber and also to track the prospective Subscribers who access the Common Point Authoring system 10 for enrollment purposes. This simplifies the Subscriber management process because each prospective Subscriber who accesses the Common Point Authoring system 10 for enrollment purposes is uniquely defined by this identifier, and the remaining Subscriber information is used for billing and identification purposes. Therefore, a Subscriber having a plurality of sites can register each site individually without confusion, since the corporate name is not the Subscriber delimiter; the Subscriber delimiter is the unique identification assigned to the enrollment and agreement form.

At step 304, the prospective Subscriber provides the requested information by completing the data entry fields of the enrollment and agreement form and transmitting the completed form to the Common Point Authoring system 10. At step 305, the Common Point Authoring system 10 generates a unique enrollment number or unique electronic signature to identify and distinguish this prospective Subscriber from all other Subscribers, including Subscribers with duplicative or identical names, and checks at step 306 whether the enrollment and agreement form has been properly completed. If not, the processing branches to step 307 where an appropriate error message is returned to the prospective Subscriber indicating the improper form completion and noting that any enrollment fees will be returned if the enrollment process is terminated at this juncture, since enrollment has not been effected. If the enrollment form is correctly completed, processing advances to step 308 where, using the processes illustrated in FIG. 4, the prospective Subscriber's name and unique enrollment number are entered into the Subscriber database 123. Again, a Subscriber having a plurality of sites can register each site individually without confusion since the unique identifier assigned to the enrollment and agreement form is the delimiter.

Figure 4:
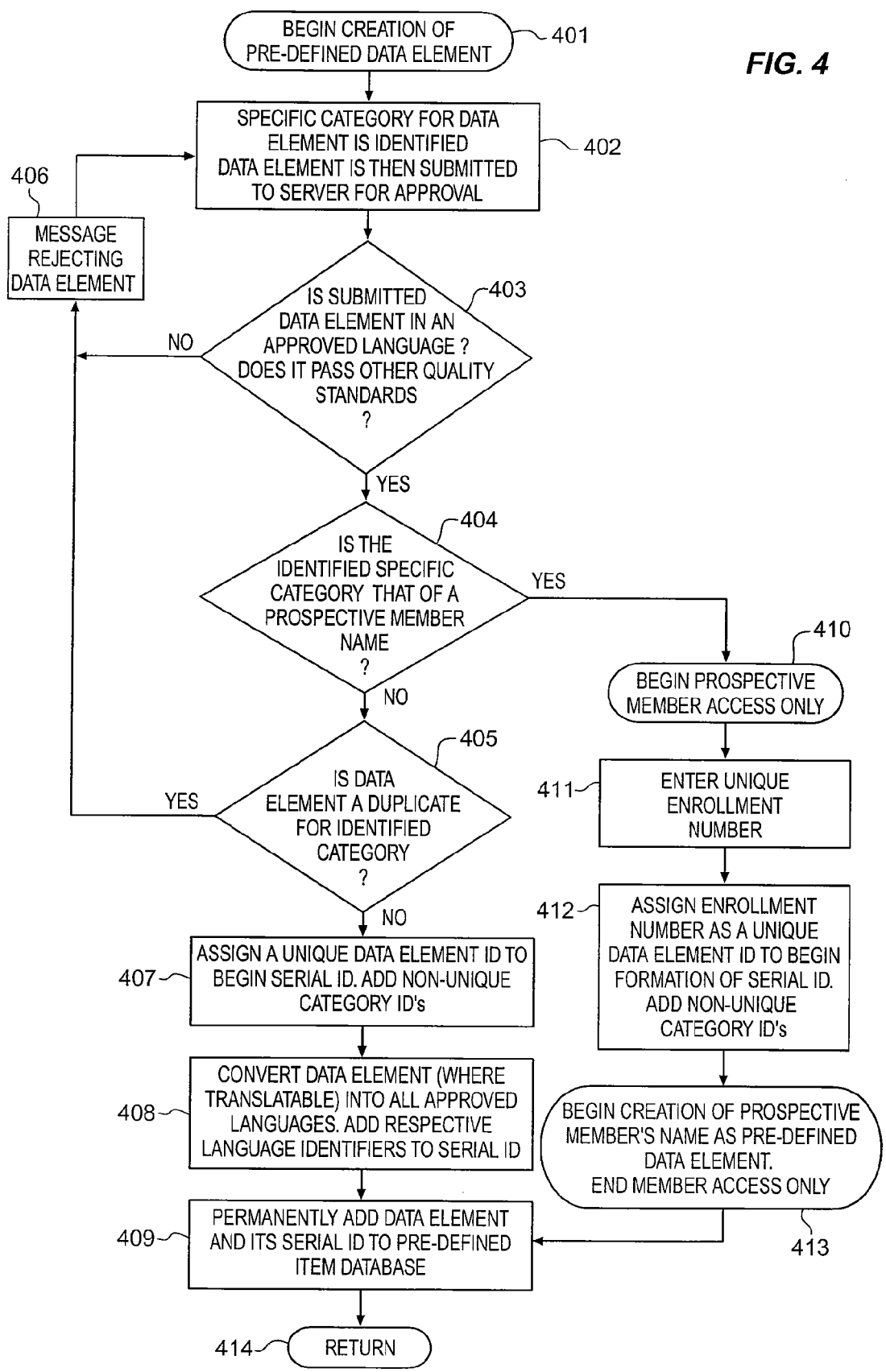
FIG. 4 illustrates, in flow diagram form, the operation of the Data Element creation process of the present Common Point Authoring system.

If the processes illustrated in FIG. 4 reject the prospective Subscriber's name, processing returns to step 307 where an appropriate error message is returned to the prospective Subscriber indicating the violation of a quality standard and noting that any enrollment fees will be returned if the enrollment process is terminated at this juncture, since enrollment has not been effected. If the prospective Subscriber's name is acceptable, at step 309 the Common Point Authoring system 10 approves the enrollment and agreement form and assigns a user name and password to this new Subscriber to enable future access of the Common Point Authoring system 10. At step 310, the Common Point Authoring system 10 deposits all of the enrollment data that was entered by the Subscriber on the enrollment and agreement form and makes an initial entry of good standing into the Subscriber database 123. An invoice is generated for the tracking/billing database 127 to debit the Subscriber for the enrollment fee. Failure of a Subscriber to timely pay for invoices, debits, usage fees, Subscriber dues, and other charges associated with subscription in the Common Point Authoring system 10 results in the striking of the entry of good standing in the Subscriber database 123.

At step 311, the Common Point Authoring system 10 transmits a notification of good standing to the Subscriber of a successful enrollment and delivers the user name and password, generated at step 309, to the Subscriber, who is now a Member of the Common Point Authoring system 10. In addition, the Common Point Authoring system 10 downloads the software modules from the software database 129 to the Subscriber terminal device T1 that are necessary to enable the Subscriber to perform the tasks for which they have subscribed. As described below, there are a number of software modules, including but not limited to: Subscriber client software, authoring client software, advertiser client software. Each of these modules corresponds to a basic function for which the Subscriber is enabled. At step 312, the Common Point Authoring system 10 invites the Member to create and register a Member ID Informational Object using the processes illustrated in FIG. 15 to be added to the Membership database 123 for future access by the Member. The enrollment process then returns to the processes of FIG. 3 and exits at step 313.

Member ID Operational Object Creation Process

Figure 15:
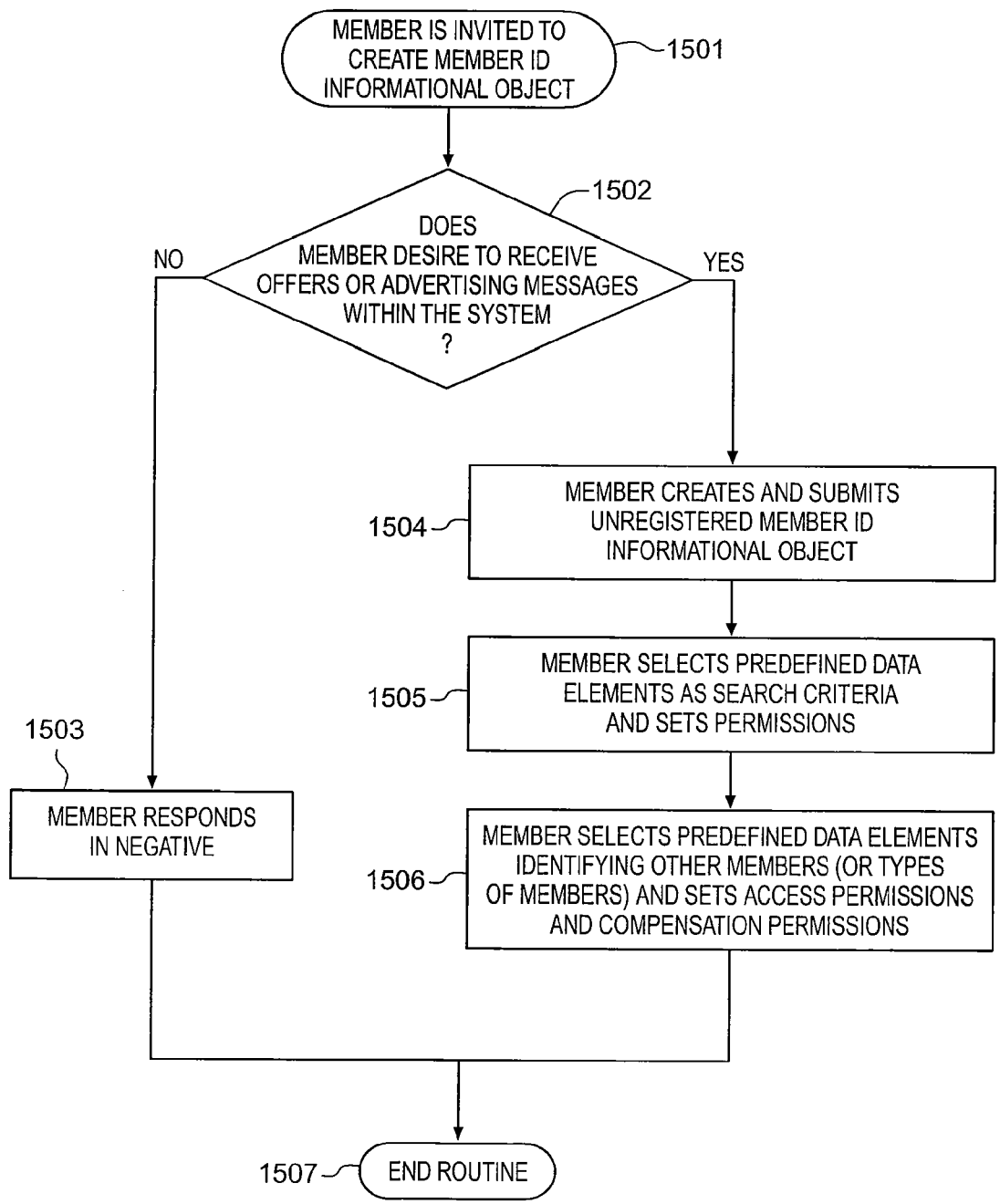
FIG. 15 illustrates, in flow diagram form, the operation of the Member ID Informational Object creation process of the present Common Point Authoring system.

FIG. 15 illustrates, in flow diagram form, the operation of the Member ID Informational Object creation and registration process of the present Common Point Authoring system during enrollment of a Member using the illustrated processes of FIG. 3. Using the processes of FIG. 15, a Member may select, and author into the Member's ID Informational Object, pre-defined Data Elements as search criteria by which that Member may be found by other Members of the Common Point Authoring System; and a Member may set initial Permissions concerning access by other Members to the information and/or instructions of the Member's ID Informational Object, including Permissions requiring compensation payable before access is permitted to the Member's ID Informational Object.

At step 1501, the Member is invited to create a Member ID Informational Object, which includes a decision on the part of the Member at step 1502 of whether they wish to receive offers or advertisements within the context of the Common Point Authoring system 10. If not, as indicated by a negative response provided by the Member at step 1503, processing exits at step 1507. If the Member wishes to receive this information, then at step 1504 the Member creates and registers a Member ID Informational Object. At step 1505, the Member selects predefined Data Elements as search criteria thereby to filter the universe of negotiating or advertising messages and sets Permissions to activate these parameters. At step 1506, the Member selects predefined Data Elements which identify other Members (or classes of Members) of the Common Point Authoring system 10 as search criteria thereby to filter the universe of Members. The Member also sets access Permissions, including compensation Permissions, to activate these parameters. Finally, processing then exits at step 1507.

Member Informational Object Creation or Updating Process

Figure 16:
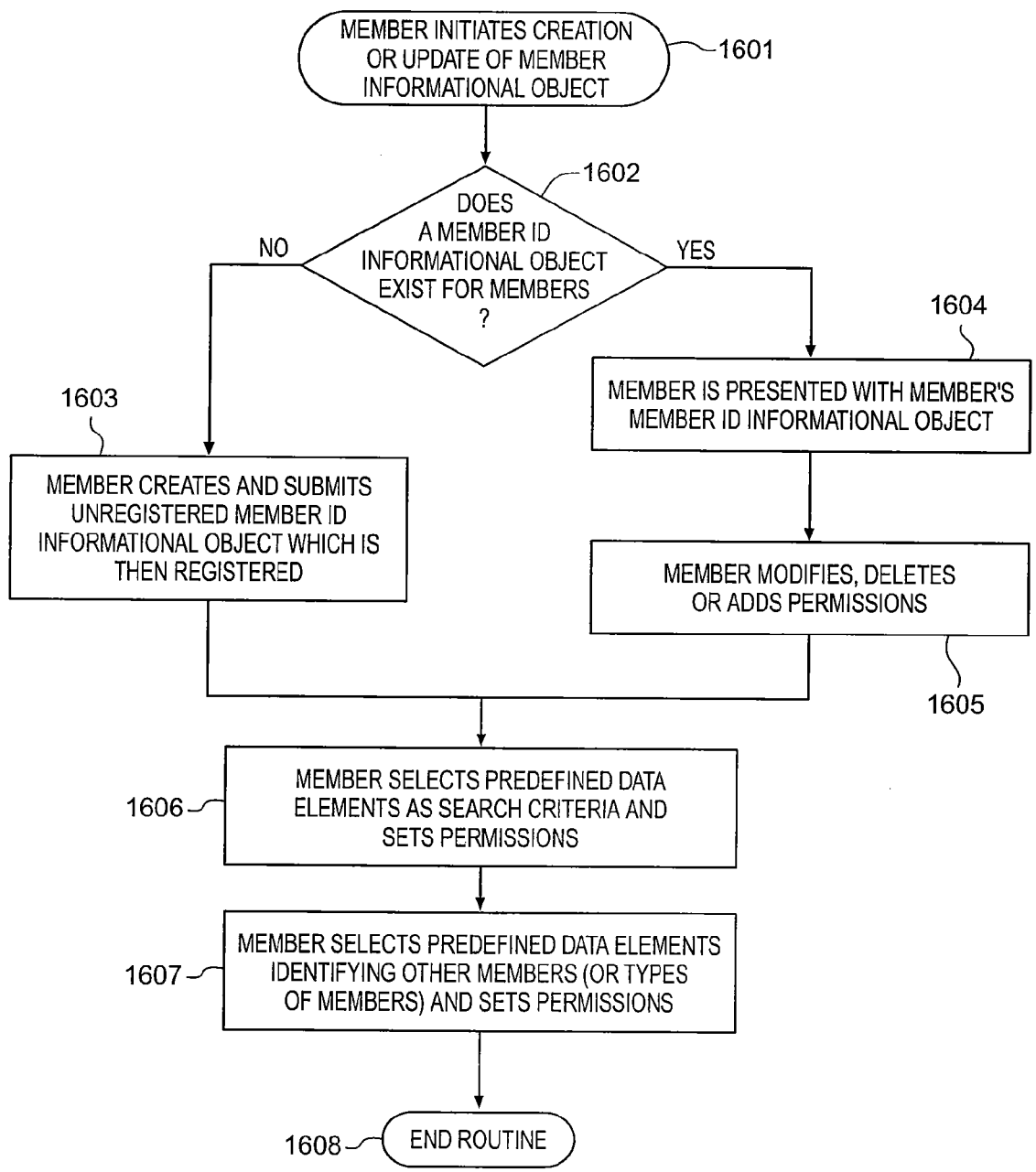
FIG. 16 illustrates, in flow diagram form, the operation of the Member ID Informational Object creation or updating process of the present Common Point Authoring system.

FIG. 16 illustrates, in flow diagram form, the operation of the Member Informational Object creation or updating process of the present Common Point Authoring system. The processes illustrated in FIG. 16 extend the processes illustrated in FIG. 15. The FIG. 16 processes illustrate how a Member of the Common Point Authoring system may initiate the creation, registration, and updating of a Member ID Informational Object.

At step 1601, the Member initiates a process to create or update a Member Informational Object. In response to this action, the Common Point Authoring system 10 at step 1602 determines whether a Member ID Informational Object exists for this Member. If an Informational Object exists, processing advances to steps 1604 where the Member is presented with their Member ID Informational Object for review and updating; processing then advances to step 1605. If an Informational Object does not exist, processing advances to step 1603 where the Member is prompted to create and register a Member ID Informational Object before processing also advances to step 1605.

Changes to the registered Member ID Informational Object are implemented by the Member at step 1605, and processing then advances to step 1606 where the Member selects predefined Data Elements as search criteria thereby to filter the universe of offers or advertising messages and sets Permissions to activate these parameters. At step 1607, the Member selects predefined Data Elements which identify other Members (or classes of Members) of the Common Point Authoring system 10 as search criteria thereby to filter the universe of Members. The Member also sets access Permissions and compensation Permissions to activate these parameters. Finally, at step 1608, processing then exits.

Data Element Creation Process

FIG. 4 illustrates, in flow diagram form, the operation of the Data Element creation process of the present Common Point Authoring system 10. The Members who are authorized to create Data Elements are Livestock Breeders, Livestock Producers, Livestock Processors, Distributors, Retailers, and Consumers, all of whom are the individuals and companies who produce or consume the products for which the Informational Objects are required. Thus, in the example of a Livestock Informational Object, the Livestock Breeders, Livestock Producers, and Livestock Processors are obligated via regulatory measures to produce a Livestock Informational Object for each animal or animal unit produced or processed. Members may also be Distributors, Retailers, or Consumers who may create Data Elements by which they may rate or comment upon the quality of fabricated products. To prevent the creation of bogus Data Elements that may corrupt the system, when a Member accesses the Common Point Authoring system 10 at step 502, the Member's identity is checked at step 503 by the authentication server 141 against an authorized Member database 123 to ensure that this Member has the good standing and Permissions to create an additional Data Element at step 513 by accessing the process illustrated in FIG. 4. Prospective Members, at step 308, may also access the process illustrated in FIG. 4 for the limited purpose of creating a Member name as a pre-defined Data Element.

At step 402, a Member, in the process of creating a Data Element at step 513, uses the authoring client software module executing on the terminal device T1 to identify and choose the category of Data Element and submits the proposed content for this Data Element. At step 402, a prospective Member, in the process of creating a Member's name as a pre-defined Data Element at step 308, is permitted by the authentication server 141 only to identify and choose a specific category for that of a Member name. In either case, the category information indicates which of the various data entry fields shown in FIG. 2 is selected for placement of this particular draft Data Element. There are typically differences among these data entry fields, and the review and certification process executed by the Common Point Authoring system 10 relates the proposed draft Data Element to all other Data Elements of this category stored in the system database.

Therefore, at step 403, the authoring server 143 of the Common Point Authoring system 10 reviews the draft Data Element to determine whether the language contained therein is in approved format and content, using a content parsing review process to compare the language of the draft Data Element with a dictionary of approved terms. In addition, where the selected category accepts image data, the image data is reviewed for content and coding where appropriate. The format similarly is checked to ensure that adequate and thorough information is provided. If the content check discerns any flaws in the draft Data Element, at step 406, a message is returned to the Member rejecting the draft Data Element, with appropriate notation relating to the reason for rejection. At step 404, if the draft Data Element is approved, the content is reviewed to determine whether the Data Element content corresponds to a Member name. If so, processing branches to step 410 where the Member name Data Element creation process subroutine is activated. This subroutine creates a standard immutable Data Element that comprises the Member name for use in creating one or more Informational Objects, since the Member's name appears on each Informational Object that the author creates. At step 411, the prospective Member enters the unique enrollment number assigned at step 305; and at step 412, the Common Point Authoring system 10 assigns the unique enrollment number as an identifier to the prospective Member's name Data Element. At step 413, the prospective Member's name and registered Data Element identifier are permanently added to the Member database 123, the subroutine ends, and processing exits at Step 414.

At step 404, if the draft Data Element is not a Member name, processing advances to step 405 where the draft Data Element is compared by the authoring server 143 with all previously registered Data Elements of this category to ensure that the draft Data Element is not duplicative of a prior Data Element. If duplication is determined, at step 406, a message is returned to the Member rejecting the draft Data Element, with appropriate notation relating to the reason for rejection. Otherwise, at step 407, the authoring server 143 of the Common Point Authoring system 10 generates a unique registered Data Element identifier and assigns this to the draft Data Element; and at step 408, the Common Point Authoring system 10 translates the Data Element into other languages and appends a language identifier to each translation of the Data Element. Processing then advances to step 409 where this newly created Data Element is permanently added to the registered Data Element database 124, along with its corresponding unique identifier. This process then exits at step 414.

Informational Object Creation Process

Figure 5:
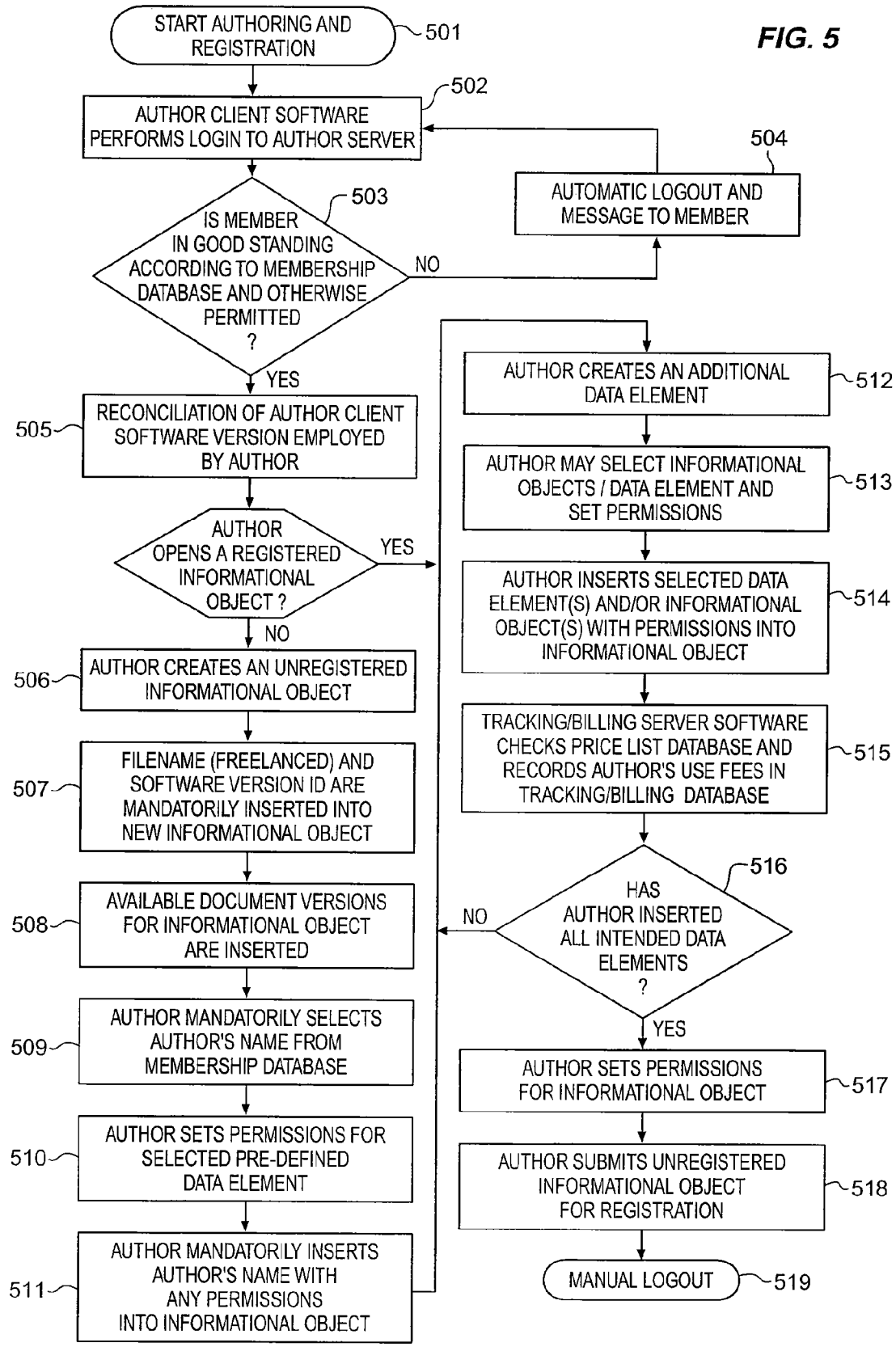
FIG. 5 illustrates, in flow diagram form, the operation of the Informational Object creation process of the present Common Point Authoring system.

FIG. 5 illustrates, in flow diagram form, the operation of the Livestock Informational Object authoring and creation process of the present Common Point Authoring system 10. The Members who are authorized to author and create Informational Objects are Livestock Breeders, Livestock Producers, Livestock Processors, Distributors, Retailers, and Consumers, all of whom are the individuals and companies who produce or consume the animals or animal products for which the Livestock Informational Objects are required.

When a Member accesses the Common Point Authoring system 10 at step 501 and executes the authoring system login process at step 502, the Member's identity is checked by the authentication server 141 against an authorized Member database 123 at step 503 to ensure that this Member is a Member in good standing and has the authoring Permissions to access the process illustrated in FIG. 5. If not, at step 504, the Common Point Authoring system 10 logs out.

If the Member is in good standing, the Common Point Authoring system 10 certifies the Member as an "author" for this process and advances to step 505 where the authoring client software module executing on the Member's terminal device T1 is checked to identify the version of the software so that the authoring session executing of the Common Point Authoring system 10 can be compatible with the Member's software. At step 505A, the Common Point Authoring system 10 diverts the Member to step 512 if the Member retrieves an existing Registered Informational Object as might occur following the creation and registration of a new Registered Informational Object at step 1713. If not, the system advances to step 506 where the Member initiates the authoring process for a Livestock Informational Object by creating an unregistered or draft Livestock Informational Object. At step 507, the authoring server 143 of the Common Point Authoring system 10 inserts various basic information into the unregistered Livestock Informational Object, such as a temporary name provided by the Member and an identifier of the software version used to create the Informational Object. The Member at step 508 identifies the various formats available for use with this Livestock Informational Object, so various Members who retrieve the Livestock Informational Object receive it formatted for their use, which formats are referred to as Document Versions. Thus, for the case of a Livestock Informational Object, there can be a Breeder Version, a Producer Version, a Processor Version, a Distributor Version, a Retailer Version, a Consumer Version, and the like. At step 509, the Member must select their name by selecting a Data Element from the Member database 123 that corresponds to a previously stored Data Element whose content is the Member's name.

The authoring server 143 at step 510 enables the Member to set Permissions for access to the Livestock Informational Object as well as for ancillary services associated with the Livestock Informational Object. At step 511, these Data Elements selected in steps 509-510 are written into the Livestock Informational Object; at step 512, the Member may create additional Data Elements using the process of FIG. 4; and at steps 513-514, the Member may use previously created Data Elements found in the Registered Data Element Database 124 for insertion into the Livestock Informational Object. Also in steps 513-514, the Member may, if permitted, select Data Elements from other accessed Informational Objects for insertion into the Livestock Informational Object being authored, or the Member may, if permitted, select other accessed Informational Objects for insertion into the Livestock Informational Object being authored. While a Member may select a registered Data Element from the Registered Data Element Database 124, steps 513-514 would also allow a permitted Member to select Data Elements from a previously authored Livestock Informational Object which would facilitate the authoring of information from one Livestock Informational Object into many Livestock Informational Objects referencing an animal's fabricated products.

At step 516, the tracking/billing server 142 of the Common Point Authoring system 10 calculates any fees that are due and enters this information into the tracking/billing database 127, and the Member determines whether all of the necessary Data Elements or Informational Objects have been inserted into the Livestock Informational Object. If not, processing returns to step 512 for the preferred insertions. If all the necessary Data Elements and Informational Objects have been provided, processing advances to step 517 where the Member sets the Permissions for this unregistered Livestock Informational Object and then transmits the unregistered Livestock Informational Object at step 518 for registration so this unregistered Livestock Informational Object can be processed to become a registered Livestock Informational Object, and the process exits at step 519.

Informational Object Registration Process

Figure 6:
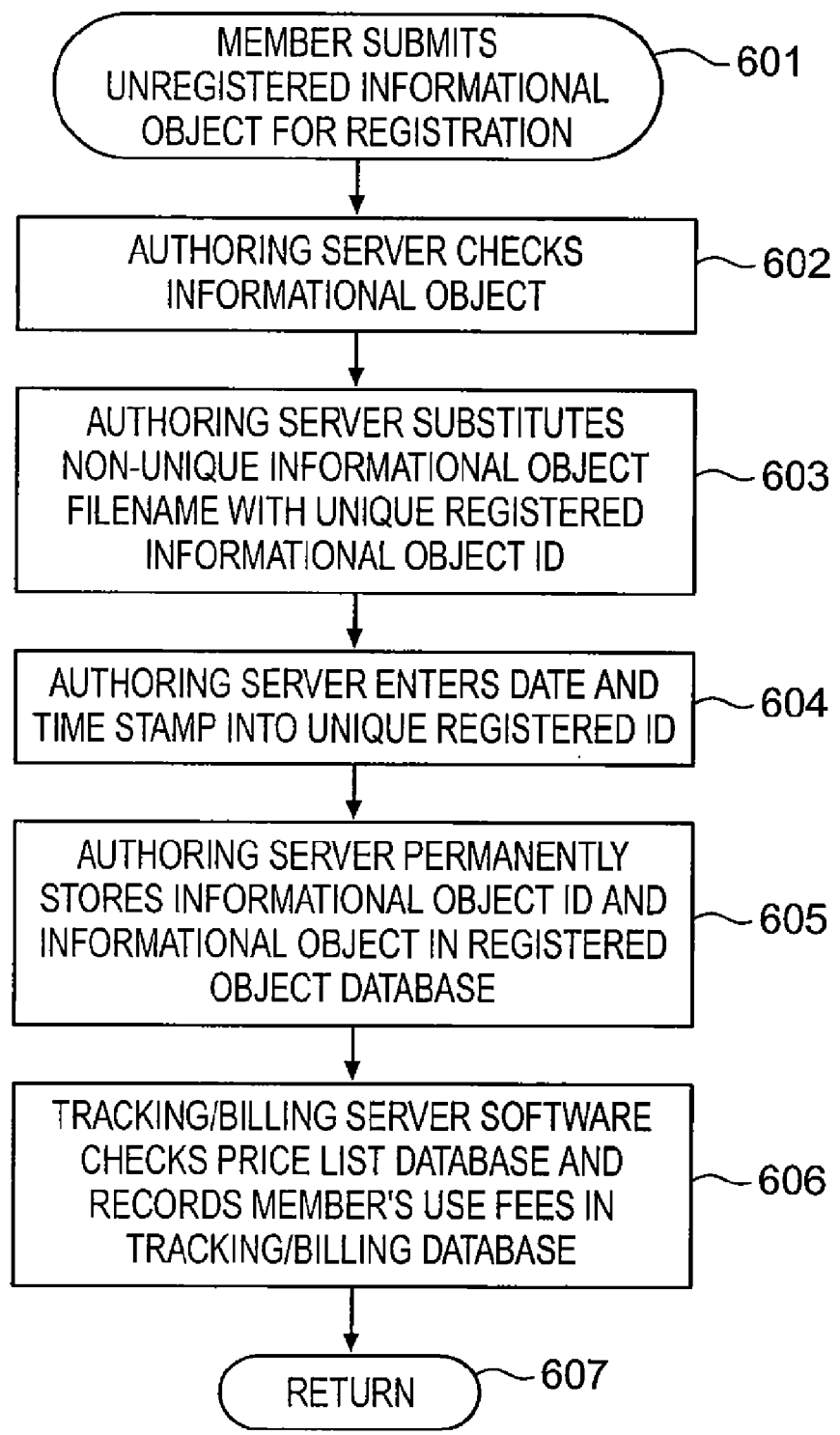
FIG. 6 illustrates, in flow diagram form, the operation of the Informational Object registration process of the present Common Point Authoring system.

FIG. 6 illustrates, in flow diagram form, the operation of the Livestock Informational Object registration process of the present Common Point Authoring system 10 following from step 518 described above.

At step 601, the unregistered Livestock Informational Object created using the process described with respect to FIG. 5 is submitted to the Common Point Authoring system 10 for registration. At step 602, the authoring server 143 checks the unregistered Livestock Informational Object for proper content, format, and Permissions. If the content and format are proper, at step 603 the authoring server 143 of the Common Point Authoring system 10 generates a unique Livestock Informational Object identification and substitutes this for the filename created by the Member. At step 604, the authoring server 143 of the Common Point Authoring system 10 date and time stamps the Livestock Informational Object to complete the registration process and stores the registered Livestock Informational Object in immutable form in the registered Informational Object database 125 at step 605. At step 605, the authoring server 143 stores the Permissions for the registered Informational Object, and the Permissions of the Data Elements of which the registered Informational Object is comprised, in the Permissions database. At step 606, the Common Point Authoring system 10 updates the tracking/billing database 127 to debit the Member's account for the cost of registering this Informational Object. This process exits at step 607.

Data Element Permissions Definition Process

Figure 7:
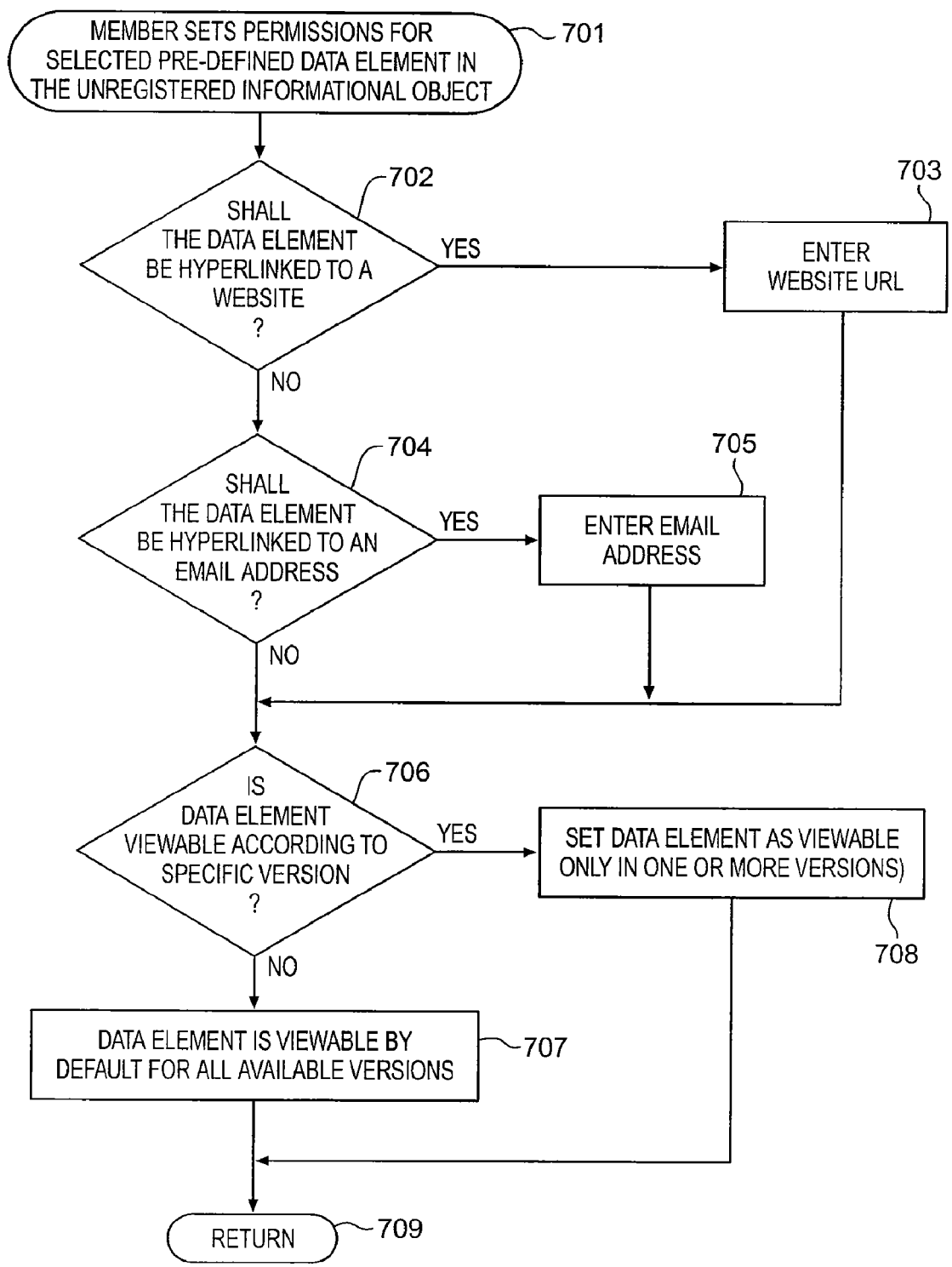
FIG. 7 illustrates, in flow diagram form, the operation of the Data Element Permissions definition process of the present Common Point Authoring system.

FIG. 7 illustrates, in flow diagram form, the operation of the Data Element Permissions definition process of the present Common Point Authoring system 10. In the above-noted description of the Livestock Informational Object authoring and creation process of FIG. 5, the Member can set default Permissions for the use of the Data Elements in the registered Livestock Informational Object following from step 513 described above.

The process illustrated in FIG. 7 details the creation process for default Permission settings. In particular, at step 701 the Member selects at least one of a plurality of default Permissions for an identified Data Element in the unregistered Livestock Informational Object. At step 702, the Common Point Authoring system 10 determines whether the Member has indicated that this Data Element shall be hyper-linked by default to a predefined WEB site. If so, the WEB site URL is entered by the Member at step 703 and processing advances to step 706 as described below.

If the Member does not link the selected Data Element to a WEB site, then at step 704 it is determined whether the Data Element is to be hyper-linked by default to an e-mail address. If so, at step 705 the Member enters the e-mail address data and processing advances to step 706. If no hyper-linking is to be set, then processing also advances to step 706. At step 706, the Common Point Authoring system 10 determines whether the Data Element is viewable by default according to a specific document version of the Data Element as defined by the Member in step 509. If so, at step 708 the Member identifies in which of the defined document versions the Data Element will be viewable by default and processing exits at step 709. If no election is made by the Member at step 707, then processing advances to step 708 where the default is automatically set that the Data Element is viewable in all document versions. Processing exits at step 709.

Informational Object Permissions Process & Offertory Procedures

Figure 8:
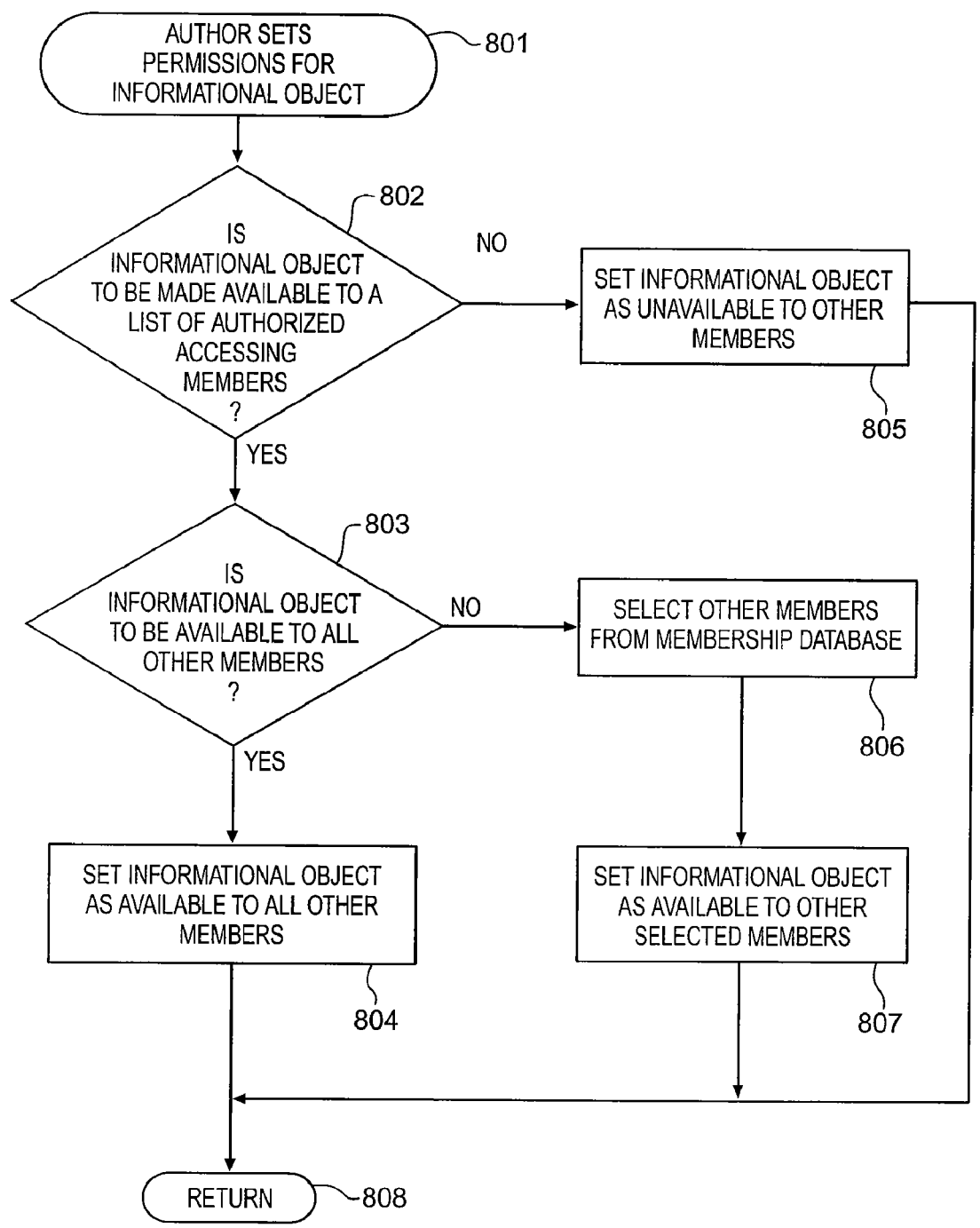
FIG. 8 illustrates, in flow diagram form, the operation of the Informational Object access Permissions definition process of the present Common Point Authoring system.

FIG. 8 illustrates, in flow diagram form, the operation of the Livestock Informational Object access Permissions definition process of the present Informational Object authoring and distribution system 10 following from step 517 described above.

At step 801, the Member, who is the Owner of a selected Livestock Informational Object, initiates the process to set access Permissions for the selected Livestock Informational Object. At step 802, the Member identifies whether any access is permitted. If no other Members are permitted to access this Informational Object, then processing advances to step 805 where the Informational Object is noted as being unavailable to any other Members and processing exits at step 808. If the Member notes that some form of access is permitted, at step 803 the Member can identify whether a limited set of Members drawn only from the Membership Database 123 can access the Informational Object. If so, processing advances to step 806 where the Member identifies, using only the Membership Database 123, the selected other Members who are authorized to access this Livestock Informational Object, and the Informational Object authoring and distribution system 10 sets the Informational Object with this list of authorized accessing Members. Processing then exits at step 808. If the Member does not limit the access to this Livestock Informational Object, then at step 804 the Informational Object authoring and distribution system 10 registers at steps 601-607 the Informational Object with an indicia that all Members can access this Informational Object, and processing exits at step 808.

Figure 17:
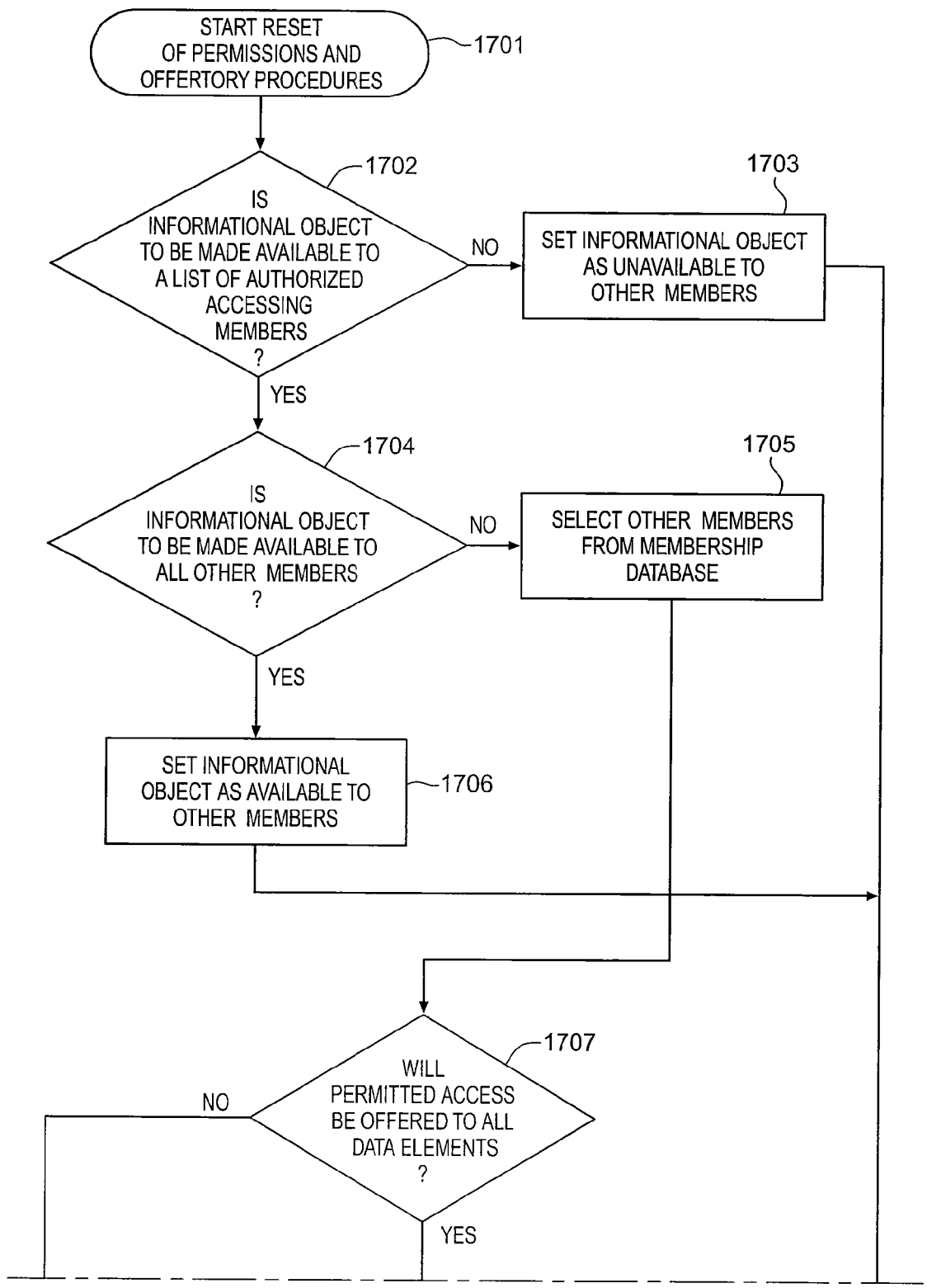
FIGS. 17 and 18 illustrate, in flow diagram form, the resetting of Permissions and the Permissions offertory processes of the present Common Point Authoring system.
Figure 18:
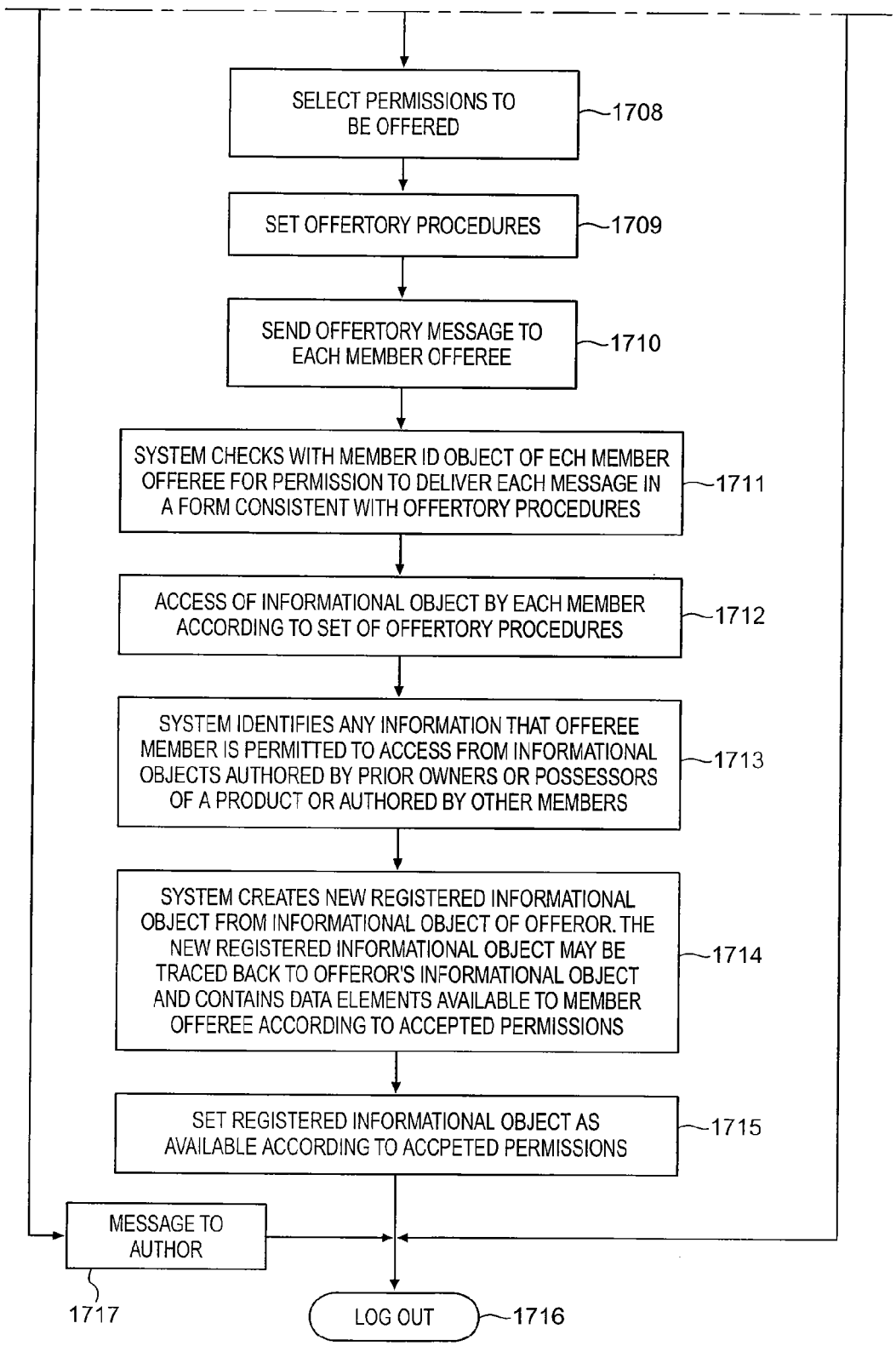

Following registration of the Livestock Informational Object, as illustrated by the processes of FIG. 5 described above, the Member/Owner may modify the default settings of Permissions for the registered Livestock Informational Object and the Data Elements registered with the Livestock Informational Object. FIGS. 17 and 18 illustrate, in flow diagram form, the operation of the default Permissions and offertory processes of the present Common Point Authoring system 10. At step 1701, the Common Point Authoring system 10 initiates the default Permissions and offertory procedures. A login process similar to that illustrated at steps 502, 503, and 504 described above may be presumed.

At step 1702, the Common Point Authoring system 10 determines whether the requested Livestock Informational Object is to be made available to a list of authorized accessing Members. If not, at step 1703 the requested Livestock Informational Object is set as unavailable, and processing exits at step 1716. If the requested Livestock Informational Object is to be made available to a list of authorized accessing Members, then at step 1704 it is determined whether the requested Livestock Informational Object is to be available to all other Members, and, if so, the requested Livestock Informational Object is set as available at step 1706, and processing exits at step 1716. Otherwise, at step 1705 the Member selects other Members from the Membership database. At step 1707, the Member determines whether access will be permitted to all Data Elements within the Livestock Informational Object. If not, a message is returned at step 1717, and processing exits at step 1716 so that the Member may employ the processes of FIG. 5 to re-author another Livestock Informational Object containing only the desired Data Elements for which access will be permitted by other Members.

If access is provided to all Data Elements in the Livestock Informational Object, then at step 1708 the offertory Member selects the Permissions to be offered. These determine the extent and longevity of the changes permitted to the Registered Livestock Informational Objects and its Data Elements. Furthermore, at step 1709 the offertory Member sets the offertory conditions, such as those controlling access to a data object by an offeree Member during the pendency of the offer, and identification of outstanding Permissions affecting the data object and its Data Elements. Once these actions are taken, the offertory Member at step 1710 transmits the offertory message to each offeree Member that is listed in the list of selected Members. As part of this transmission process, the Common Point Authoring system 10 checks the database at step 1711 to determine whether each Member so identified has authorized, in their associated Member ID object, Permission to receive delivery of the offertory message. The access by the selected Members is affected in step 1712 where the access of the Livestock Informational Object is managed pursuant to the offertory procedures set by the offering Member. At step 1713, the Common Point Authoring system 10 identifies any information that the offeree Member is permitted to access from Informational Objects authored by prior owners or possessors of an animal product or any information that had been authored any other Members. Such Permission may be provided, for instance, to provide ready access to regulatory information that must be moved down a supply chain without restriction. At step 1714, the Common Point Authoring system 10 creates a new Registered Informational Object from the offeror Member's Livestock Informational Object. The significance of this process, for example, is that the new Registered Informational Object may be traced back by the Common Point Authoring system 10 to the offeror Member's Livestock Informational Object for as many times as an animal is transferred from Owner to a new Owner and then, following harvest of the animal, for as many times as the animal's products are transferred from Livestock Processor to Distributor to Retailer to Consumer. The registered Livestock Informational Object is set as available to other selected Members at step 1715 when the selected Members have accepted their respective offers. The Common Point Authoring system 10 also sets the accepted Permissions and processing exits at step 1716.

Member Access Process

Figure 9:
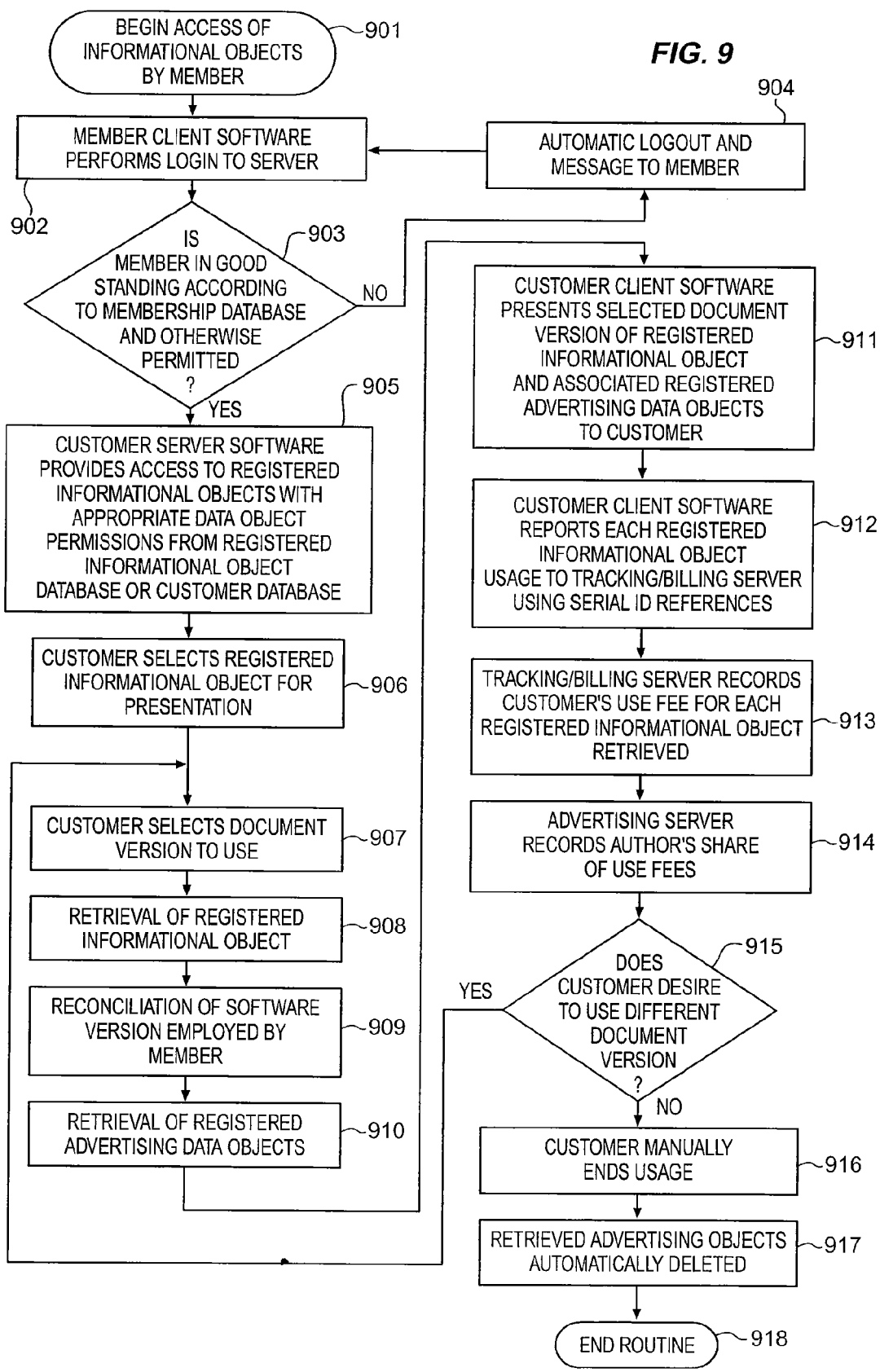
FIG. 9 illustrates, in flow diagram form, the operation of the Subscriber access process of the present Common Point Authoring system.

FIG. 9 illustrates, in flow diagram form, the processes for accessing a Registered Livestock Informational Object by a Member of the present Common Point Authoring system 10. Any Livestock Breeder, Livestock Producer, Livestock Processor, Distributor, Retailer, Consumer, or third party vendor who holds and controls one or more Permissions to gain access to a Registered Livestock Informational Object may do so following the processes of FIG. 9. Such accessing Member may be an initial author and registrant of the Registered Livestock Informational Object or may have purchased or received one or more Permissions to gain access to the Livestock Informational Object via the Permission offertory and acceptance procedures of FIGS. 17 and 18.

The Permission offertory and acceptance procedures illustrated in FIGS. 17 and 18 empower data ownership and control in the hands of those holding the Permissions to authored and created Data Elements and Livestock Informational Objects. The processes illustrated in FIG. 9 prevent unauthorized access of a Livestock Informational Object or Data Element without proper authority (i.e., without the appropriate Permissions).

As noted under the Definitions described above, Permissions may be (1) exclusive or non-exclusive, (2) conditional or permanent, and/or (3) limited or unrestricted. Exclusiveness may be based upon criteria set forth in a Member ID Informational Object (e.g., Members of a certain livestock organization may be granted exclusive access to a Livestock Informational Object and its Data Elements). Conditionality may be premised upon payment of royalties or compensation for each access of a Livestock Informational Object and its Data Elements. Limitations may be couched in terms of what a Permission holder cannot do (e.g., a Consumer may be allowed by a Retailer to view an Informational Object on a computer screen but not be permitted to copy any viewed information to a computer file or print any viewed information to paper).

When a Member accesses the Common Point Authoring system 10 at step 901 and executes the Member access system login process at step 902, the Member's identity is checked against an authorized Member database 123 by the authentication server 141 at step 903 to ensure that this Member is a Member in good standing and has the Permissions to access the process illustrated in FIG. 9. If not, at step 904, the Common Point Authoring system 10 logs out.

If the Member is in good standing, the Common Point Authoring system 10 advances to step 905 where the Member server 144 provides the Member with access to the Informational Object database 125 using the predefined set of Permissions for both the Member and the Livestock Informational Objects. At step 906, the Member selects one of the Livestock Informational Objects for retrieval and the document version of the Informational Object at step 907. The Common Point Authoring system 10 retrieves the selected Informational Object at step 908 and conforms the software version executing on the Member's terminal device T1 with that defined as pertinent to the selected Livestock Informational Object at step 909. At step 910, the Member accessing server 144 reviews the advertising Permissions associated with the retrieved Livestock Informational Object and retrieves these advertisements for presentation to the Member along with the selected Livestock Informational Object for permitted use by Member at step 911. At step 912, the Member access software records the Member's access to Livestock Informational Objects and updates the Member's entries in the tracking/billing database 127 to debit the Member for this Livestock Informational Object retrieval at step 913. At step 914, the tracking/billing server 142 of the Common Point Authoring system 10 stores data in the tracking/billing database 127 indicative of the Member who authored this Livestock Informational Object and credits that authoring Member with an amount indicative of their share of the revenue obtained by this Livestock Informational Object retrieval. At step 915, the Common Point Authoring system 10 determines whether the Member wishes to view another document version of this Livestock Informational Object and, if so, returns to step 907 as described above. If not, processing advances to step 916 where the Member terminates this Informational Object access session, the advertising data objects are expunged at step 917, and processing completes at step 918.

Advertisement Authoring Process

Figure 10:
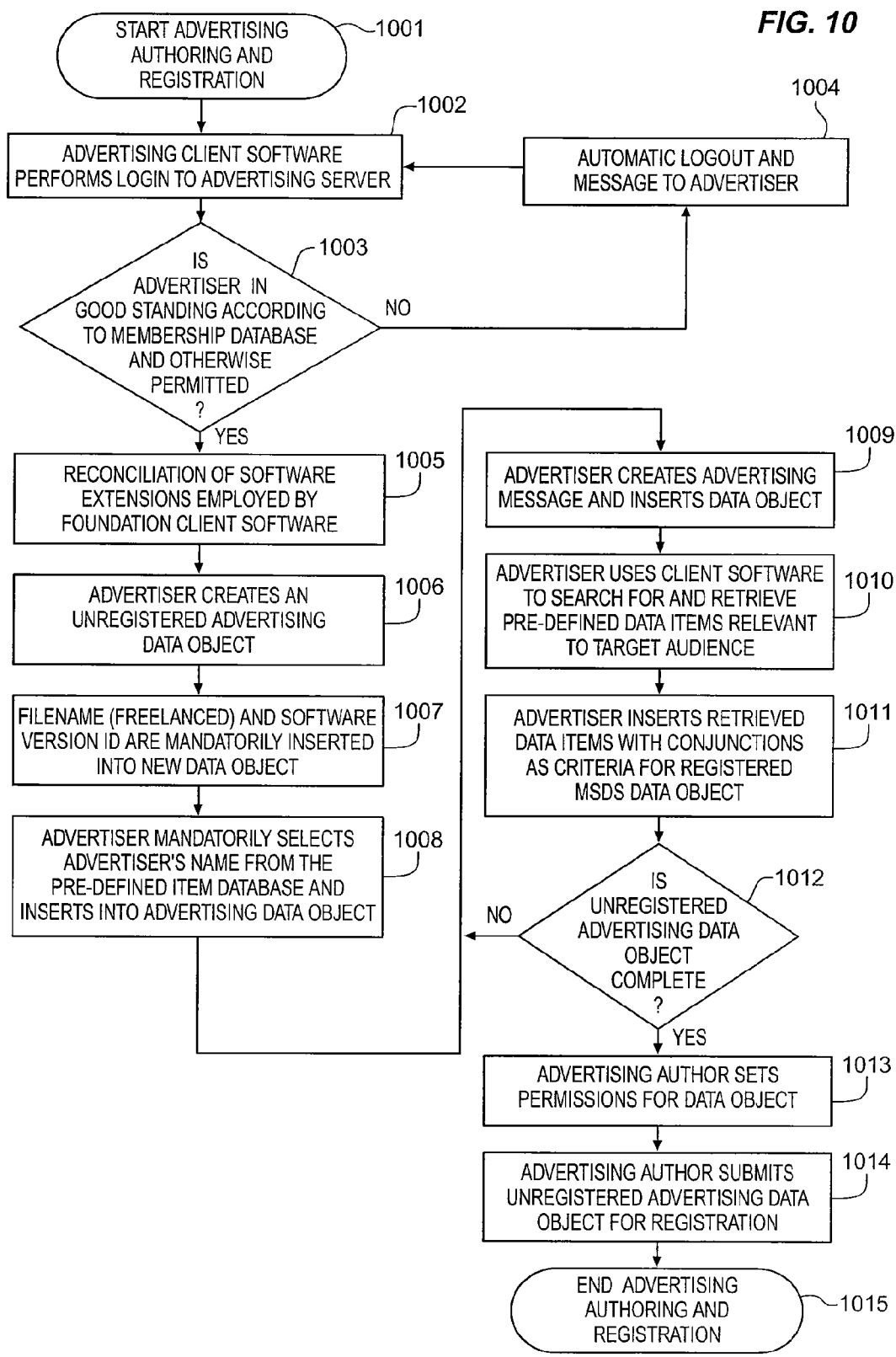
FIG. 10 illustrates, in flow diagram form, the operation of the advertisement authoring process of the present Common Point Authoring system.

FIG. 10 illustrates, in flow diagram form, the operation of the advertisement authoring process of the present Common Point Authoring system 10. Advertisements may be authored by any Member including a Livestock Breeder, Livestock Producer, Livestock Processor, Distributor, Retailer, Consumer, or any entity that owns or consumes an animal or its products within the livestock beef industry supply, distribution, and consumption chain. An advertiser may also be a third party vendor who advertises to provide services and products related to the information and instructions contained in Livestock Informational Objects. The advertising processes illustrated in FIGS. 10 through 14, and the offertory and acceptance procedures illustrated in FIGS. 17 and 18, are the processes of any marketplace where commodities may be sold for profit, be it of physical commodities like livestock or of intangible commodities like Registered Livestock Informational Objects.

When a Member accesses the Common Point Authoring system 10 at step 1001 and executes the login process at step 1002, the Member's identity is checked by the authentication server 144 against an authorized Member database 123 at step 1003 to ensure that this Member is a Member in good standing and has the Permissions to access the advertising authoring process illustrated in FIG. 10. If not, at step 1004, the Common Point Authoring system 10 logs out.

If the Member is in good standing, the Common Point Authoring system 10 advances to step 1005 where the advertising server 145 (or alternatively the authoring server 143) of the Common Point Authoring system 10 reconciles this Member's software version with that presently executing on the Common Point Authoring system 10. At step 1006, the Member initiates the authoring process for an advertisement by creating an unregistered or draft advertising data object. At step 1007, the advertising server 145 of the Common Point Authoring system 10 inserts into the unregistered advertising data object a temporary name created by the Member and a software version used to create the advertising data object. The Member, at step 1008, must select their name by selecting a Data Element from the Member database 123 that corresponds to a previously stored Data Element whose content is the Member's name. The advertising server 145, at step 1009, enables the Member to create the advertising message and insert this into the unregistered advertising data object. At step 1010, the Member searches the Data Element database 124 to identify various Data Elements that would be relevant to the unregistered advertising data object and inserts data that identify these Data Elements into the advertising data object at step 1011. At step 1012, the Member determines whether the advertising data object is complete. If not, processing returns to step 1009 and, if so, processing advances to step 1013 where the advertising Member sets the Permissions for this advertising data object. See steps 1305, 1306, and 1307 where Permissions set by the Member determine whether there is retrieval of the advertising data object at step 1310 or deletion of the advertising association record at step 1312. At step 1014, the Member submits the unregistered advertising data object to the Common Point Authoring system 10 for registration, and the advertising authoring process exits at step 1015.

Advertisement Registration Process

Figure 11:
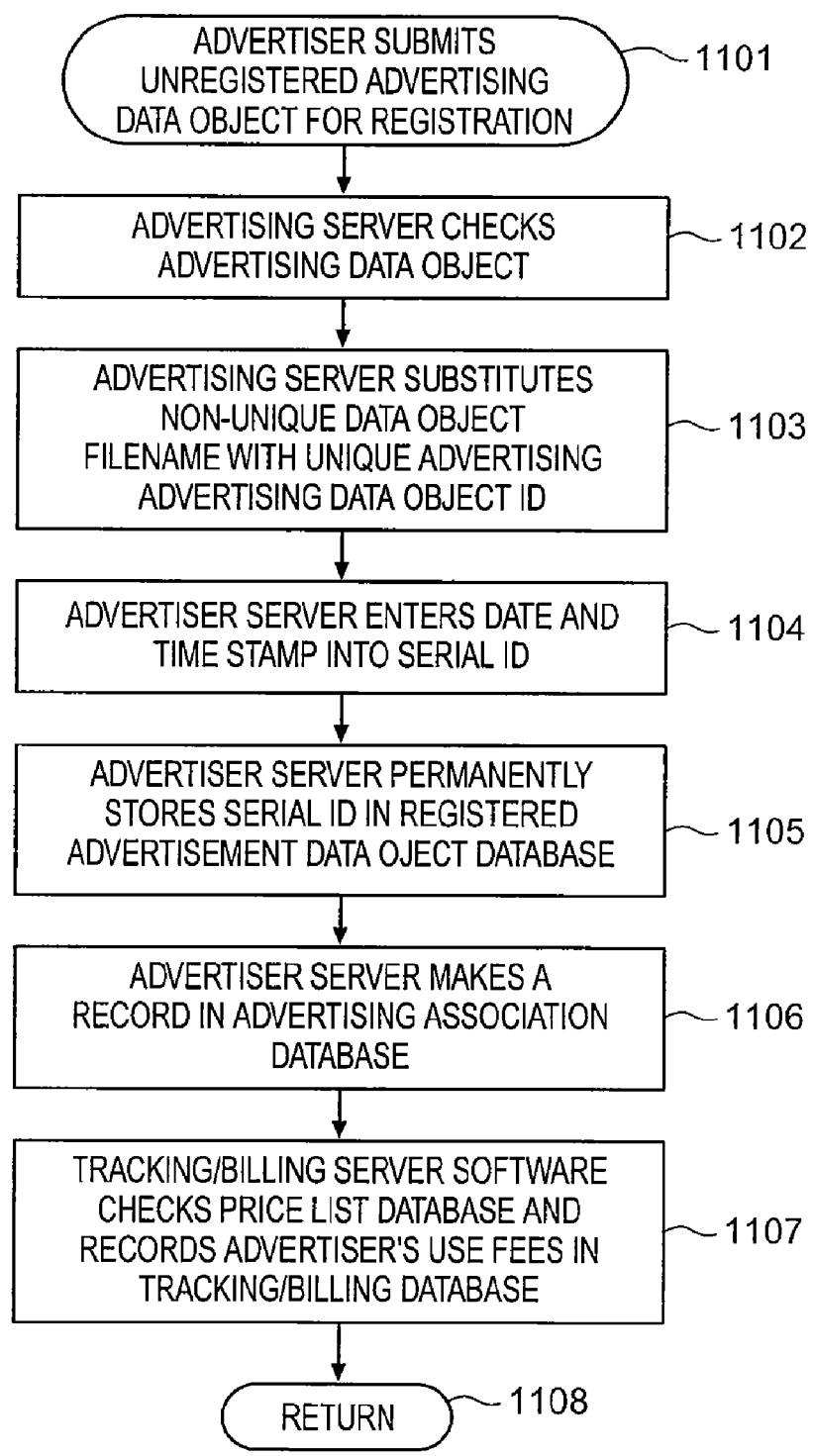
FIG. 11 illustrates, in flow diagram form, the operation of the advertisement registration process of the present Common Point Authoring system.

FIG. 11 illustrates, in flow diagram form, the operation of the advertisement registration process of the present Common Point Authoring system 10.

The unregistered advertising data object created via the process defined in FIG. 10 is processed for registration using the process of FIG. 11. In particular, at step 1101, the unregistered advertising data object is submitted to the Common Point Authoring system 10 for registration, and at step 1102, the advertising server 145 checks the unregistered advertising data object for proper content, format, and Permissions. If the content and format are proper, at step 1103 the advertising server 145 of the Common Point Authoring system 10 generates a unique advertising data object identifier and substitutes this for a temporary filename created by the Member. At step 1104, the advertising server 145 of the Common Point Authoring system 10 date and time stamps the advertising data object. At step 1105, the advertising server 145 stores the unique advertising data object identification inserted at step 1103, the date and time stamp inserted at step 1104, the search criteria inserted at step 1011, the advertising message inserted at step 1009, and the Permissions inserted at step 1013 in an immutable form in the registered advertisement database 126. At step 1106, the advertising server 145 produces a record of the advertising data object in the advertising association database 128. At step 1107, the Common Point Authoring system 10 updates the tracking/billing database 127 to debit the Member's account for the cost of registering this advertising data object. This process exits at step 1108 to return to the process defined in FIG. 10.

Advertising Access Record Process

Figure 12:
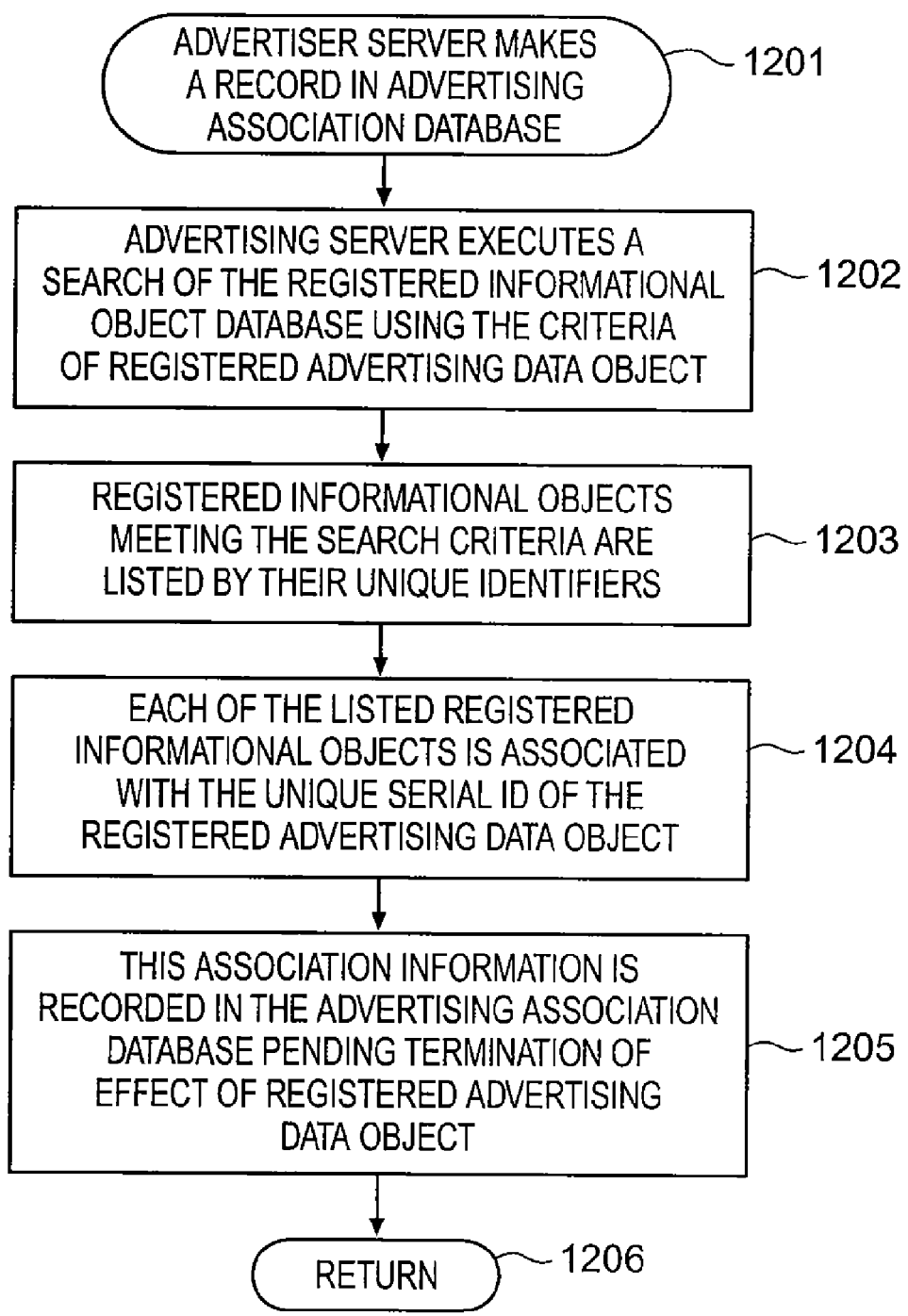
FIG. 12 illustrates, in flow diagram form, the operation of the advertising access record process of the present Common Point Authoring system.

FIG. 12 illustrates, in flow diagram form, the operation of the advertising access record process of the present Common Point Authoring system 10. This process is initiated at step 1201 from the step 1106 noted above. At step 1202, the advertising server 145 executes a search of the Registered Informational Object database 125 using the search criteria entered at step 1011 for the Advertising Data Object registered at step 1105. At step 1203, the Registered Informational Objects matching the search criteria entered at step 1011 are organized and listed by their unique identifiers. At step 1204, each of the matching unique identifiers of step 1203 is associated with the unique identifier of the Advertising data object registered at step 1105. At step 1205, the associated information of step 1204 is recorded in the Advertising Association database 128 for speeding up the processing at steps 1303, 1304, 1305, 1306, and 1307 pending termination of the effect of the Registered Advertising Data Object as determined by the Permissions entered at step 1013. Upon completing step 1205, or in the event no Registered Informational Object matches the criteria of Registered Advertising Data Object in step 1202, then step 1106 is deemed to be completed and there is a return from step 1206 to step 1107.

Registered Advertisement Retrieval Process

Figure 13:
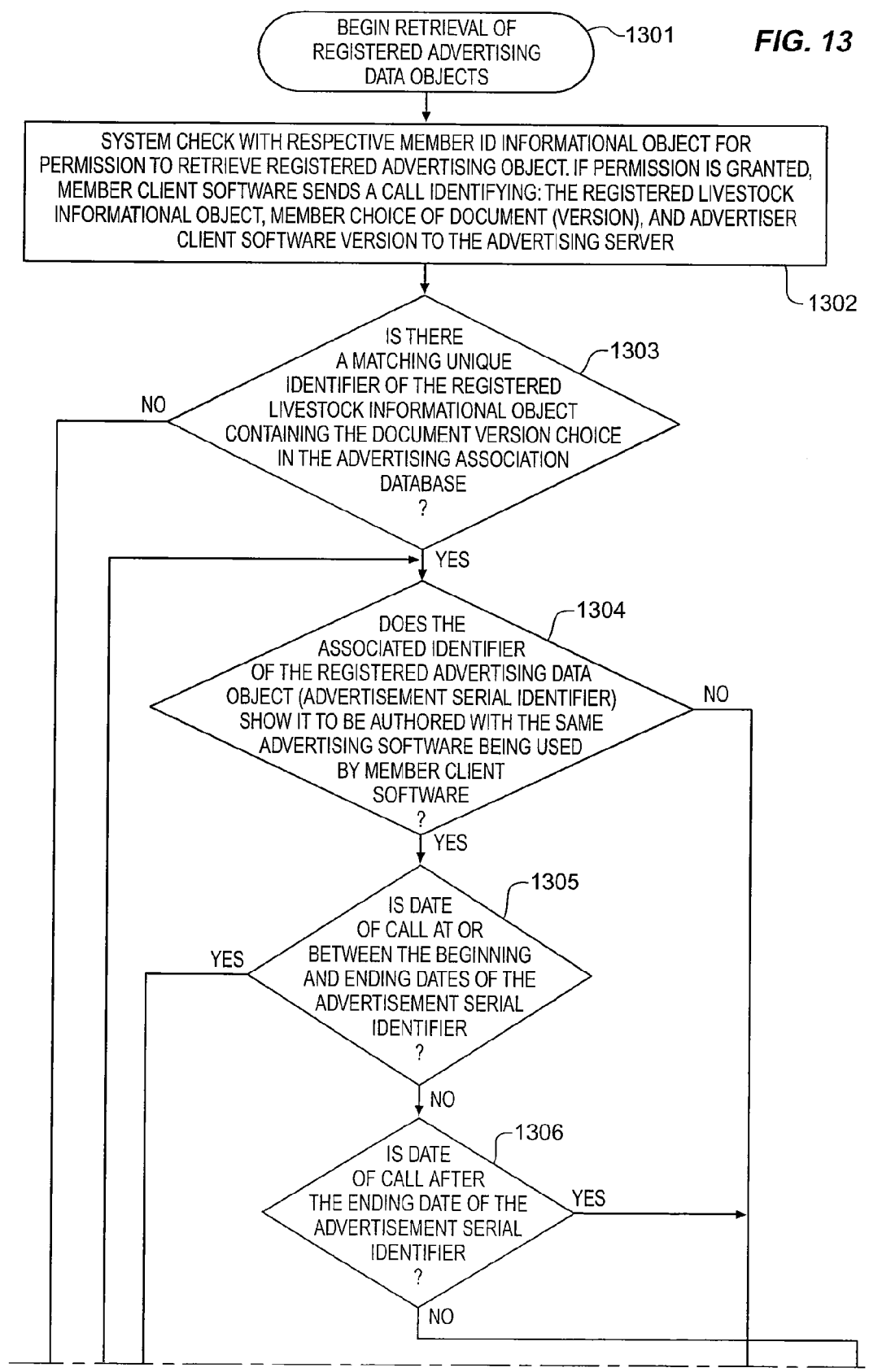
FIGS. 13 and 14 illustrate, in flow diagram form, the operation of the registered advertisement retrieval process of the present Common Point Authoring system.
Figure 14:
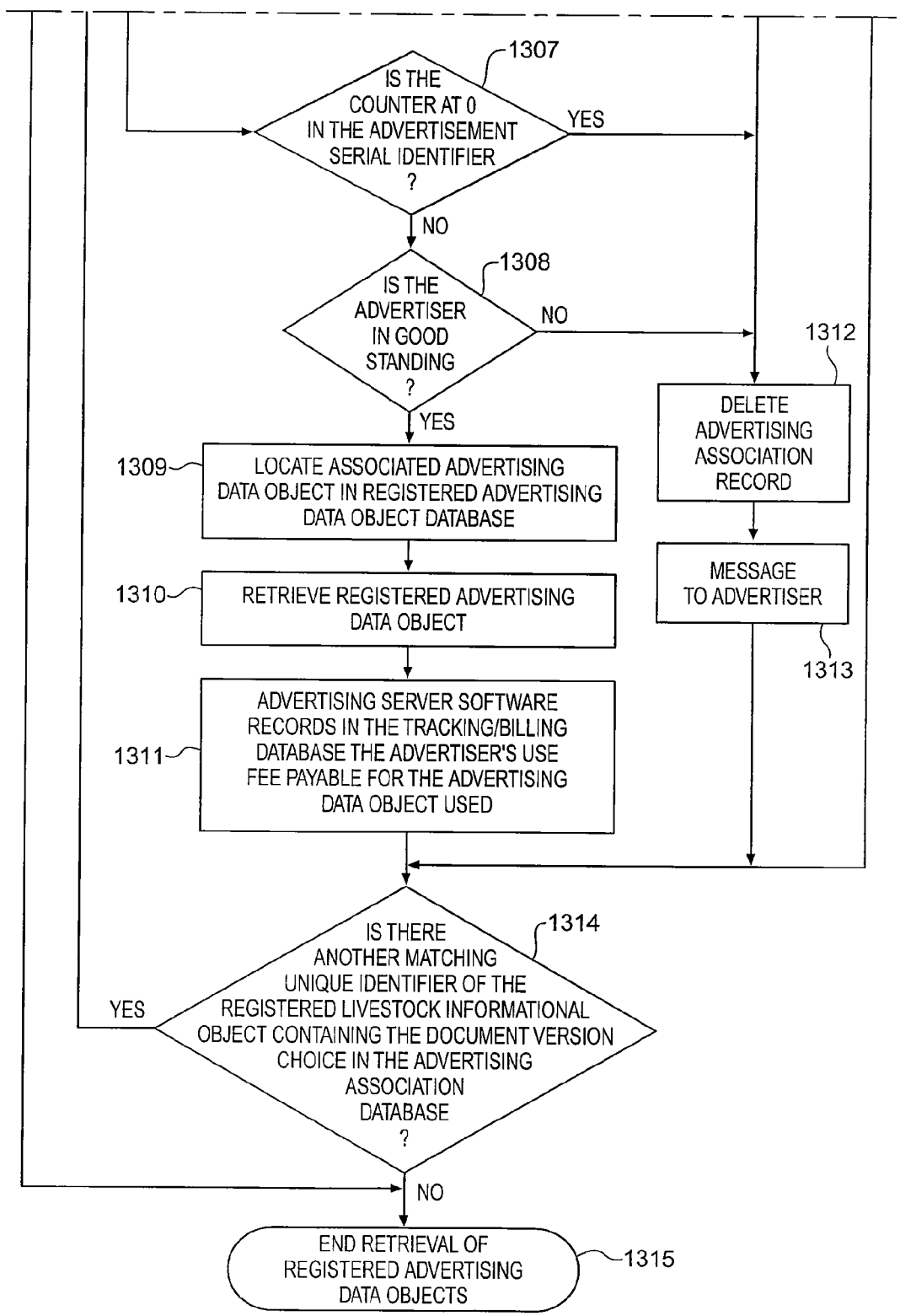

FIGS. 13 and 14 illustrate, in flow diagram form, the operation of the registered advertisement retrieval process of the present Common Point Authoring system 10.

When a Member retrieves an Informational Object, registered advertising data objects may be retrieved at step 910 as described above. This retrieval process is initiated at step 1301, and at step 1302, the Member's client software transmits data to the Common Point Authoring system 10 to check with the respective Member ID Informational Object for any Permissions that would authorize retrieval of registered advertising objects, to identify the selected Livestock Informational Object, the format of the Livestock Informational Object to be retrieved, and the advertising client software. The advertising server at step 1303 determines whether there is a unique Informational Object identifier in the advertising association database 128 that matches the Informational Object selected by the Member. If not, processing exits at step 1315.

If the advertising server 145 detects a match between an Informational Object selected by the Member and a record in the advertising association database 128, then at step 1304 the software compatibility between the advertising client executing on the Member's terminal device and that defined for the identified advertisement is checked, and if an incompatibility is detected, at step 1312 the advertising server 145 deletes the record of the advertising association and notifies the advertiser at step 1313 of the record deletion. At step 1314, the advertising server 145 determines whether other matches have occurred, and if not, processing exits at step 1315. If another match occurs, processing returns to step 1304. If there is a compatibility of software determined at step 1304, the advertising server at steps 1305-1307 determines whether the advertisement has expired according to the Permissions entered at step 1013. If not, processing advances to step 1308 where the advertiser is identified and their standing is determined. If the advertiser is not in good standing or the advertisement has expired, processing advances to step 1312 as noted above. Otherwise, processing advances to step 1309 where the identified advertising data object is located in the advertising database 126 and retrieved at step 1310 for presentation to the Member at step 911. At step 1311, the advertising server 145 updates the tracking/billing database 127 to note the fee due for the use of the advertisement. Processing then proceeds to step 1314 as described above.

Summary

The invention of the Common Point Authoring system facilitates the immutable authoring, unique identification, authentication, tracking, ownership and control, advertising, sale, and/or purchase of Informational Objects that are authored in and along an ownership segmented commercial supply, distribution, and consumption chain as part of a product creation or manufacturing, product distribution, and/or product consumption process.

What is claimed as new and desired to be protected by Letters Patent of the United States is:

1. A method for maintaining data for use by authoring and accessing members to track uniquely identified products, comprising:
   enabling an authorized authoring member to create data comprising a draft informational object, which uniquely identifies a product for tracking purposes;
   authenticating the draft informational object created by the authorized authoring member;
   converting the authenticated informational object created by the authorized authoring member to a corresponding immutable informational object which is identified by a unique identifier;
   writing the created immutable informational object into a memory for use by authorized accessing members;
   transmitting offer data from the authorized authoring member to members identified in the offer data to enable the identified members to access and change data corresponding to data that is contained in the immutable informational object; and
   enabling members identified in the offer data to access and change data corresponding to data that is contained in the immutable informational object to an extent and for a duration defined by permissions set by the authorized authoring member in the offer data, comprising:
      creating a copy of the immutable informational object,
      enabling an identified accessing member to revise data contained in the copy of the immutable informational object to the extent and for the duration defined by the permissions, and
      relating the copy of the immutable informational object, containing the revised data, to the immutable informational object.

2. The method for maintaining data for use by authoring and accessing members of claim 1 further comprising:
   enabling an authorized accessing member to retrieve a selected informational object.

3. The method for maintaining data for use by authoring and accessing members of claim 1 wherein the step of enabling comprises:
   blocking access to the copy of the immutable informational object upon expiry of the duration defined by the offer data.

4. The method for maintaining data for use by authoring and accessing members of claim 3 wherein the authorized authoring member creates an immutable informational object, the step of converting further comprises:
   associating the unique identifier assigned to the created immutable informational object with the unique identifiers that correspond to a selected set of a plurality of data elements.

5. The method for maintaining data for use by authoring and accessing members of claim 1 further comprising:
   providing, in response to access of an informational object by the authorized accessing member, the authorized accessing member with data representative of an ancillary one of a product and a service relating to the accessed informational object.

6. The method for maintaining data for use by authoring and accessing members of claim 1 further comprising:
   enabling an authorized advertising member to create a draft advertising data object;
   authenticating the draft advertising data object created by the authorized advertising member; and
   converting the authenticated advertising data object created by the authorized advertising member to a corresponding immutable advertising data object maintained in a read-only mode.

7. The method for maintaining data for use by authoring and accessing members of claim 6 further comprising:
   providing, in response to access of an informational object by the authorized accessing member, the authorized accessing member with access to a one of the advertising data object relating to the accessed informational object.

8. A common point authoring system for maintaining data for use by authoring and accessing members to track uniquely identified products, comprising:
   an authoring server for enabling an authorized authoring member to create data comprising a draft informational object;
   an informational object database for maintaining in a read-only mode a set of data that defines an informational object, the set of data comprising a plurality of the unique identifiers that correspond to a selected set of a plurality of data elements;
   an authentication server for authenticating the draft informational object created by the authorized authoring member;
   an authoring server for converting the draft informational object created by the authorized authoring member to a corresponding immutable informational object which is identified by a unique identifier;
   a database manager for writing the created immutable informational object into the informational object database;
   an offer transmitter for transmitting offer data from the authorized authoring member to members identified in the offer data to enable the identified members to access and change data corresponding to data that is contained in the immutable informational object; and an informational object offertory server for enabling members identified in the offer data to access and change data corresponding to data that is contained in the immutable informational object to an extent and for a duration defined by permissions set by the authorized authoring member in the offer data, comprising:
- a copy process for creating a copy of the immutable informational object,
- an informational object editor for enabling an identified accessing member to revise data contained in the copy of the-immutable informational object to the extent and for the duration defined by the permissions, and
- an informational object accessing member authoring server for relating the copy of the immutable informational object, containing the revised data, to the immutable informational object.

9. The common point authoring system of claim 8 further comprising:
- a member server for enabling an authorized accessing member to retrieve a selected informational object.

10. The common point authoring system of claim 8 wherein the informational object offertory server comprises:
- an offer timer for blocking access to the informational object upon expiry of the duration defined by the offer data.

11. The common point authoring system of claim 8 wherein the authorized authoring member creates an informational object, the authoring server further comprises:
- mapping associating the unique identifier assigned to the created immutable informational object with the unique identifiers that correspond to a selected set of the plurality of data elements.

12. The common point authoring system of claim 8 further comprising:
- an advertising server, responsive to access of an informational object by the authorized accessing member, for providing the authorized accessing member with data representative of an ancillary data object, one of either or both a product and a service relating to the accessed informational data object.

13. The common point authoring system of claim 12 further comprising:
- an advertising authoring server for enabling an authorized advertising member to create a draft advertising data object comprising one or more of a plurality of immutable data elements;
- an advertising authentication server for authenticating the draft advertising data object created by the authorized advertising member; and
- an advertising storage server for converting the authenticated advertising data object created by the authorized advertising member to a corresponding immutable advertising data object maintained in a read-only mode.

14. The common point authoring system of claim 13 further comprising:
- an advertising access server, responsive to access of an informational object by the authorized accessing member, for providing the authorized accessing member with access to a one of the advertising data object relating to the accessed informational object.

* * * * *